(12) United States Patent
Tang et al.

(10) Patent No.: US 12,470,794 B2
(45) Date of Patent: Nov. 11, 2025

(54) FOLLOW FOCUS CONTROLLER AND FOLLOW FOCUS SYSTEM

(71) Applicant: SHENZHEN LEQI NETWORK TECHNOLOGY CO., LTD, Shenzhen (CN)

(72) Inventors: Wei Tang, Shenzhen (CN); Feng Zhou, Shenzhen (CN); Peiwen He, Shenzhen (CN); Jinxu Lai, Shenzhen (CN); Wenjie Cao, Shenzhen (CN)

(73) Assignee: SHENZHEN LEQI NETWORK TECHNOLOGY CO., LTD, Shenzhen (CN)

( * ) Notice: Subject to any disclaimer, the term of this patent is extended or adjusted under 35 U.S.C. 154(b) by 213 days.

(21) Appl. No.: 18/459,450

(22) Filed: Sep. 1, 2023

(65) Prior Publication Data
US 2024/0080539 A1     Mar. 7, 2024

(30) Foreign Application Priority Data

| Sep. 2, 2022 | (CN) | 202211070774.2 |
| Sep. 2, 2022 | (CN) | 202222344551.2 |
| Sep. 2, 2022 | (CN) | 202222347972.0 |
| Sep. 2, 2022 | (CN) | 202222348013.0 |

(51) Int. Cl.
*H04N 23/54* (2023.01)
*G03B 17/56* (2021.01)
*H04N 23/695* (2023.01)

(52) U.S. Cl.
CPC .......... *H04N 23/54* (2023.01); *G03B 17/563* (2013.01); *H04N 23/695* (2023.01)

(58) Field of Classification Search
None
See application file for complete search history.

(56) References Cited

U.S. PATENT DOCUMENTS

2016/0054540 A1* 2/2016 Kogure ............... G02B 7/04
                                            359/824
2018/0217352 A1* 8/2018 Kamba ............... H04N 23/673

* cited by examiner

*Primary Examiner* — Mekonnen D Dagnew

(57) ABSTRACT

A follow focus controller and a follow focus system are provided. The follow focus controller includes: a body; a first follow focus adjusting assembly and a second follow focus adjusting assembly, arranged on the body; and a control assembly, arranged on the body and configured to generate a first follow focus control signal according to a rotation of the first follow focus adjusting assembly or to generate a second follow focus control signal according to a rotation of the second follow focus adjusting assembly. The first follow focus control signal and the second follow focus control signal are configured to control different follow focus motors.

41 Claims, 18 Drawing Sheets

FOLLOW FOCUS CONTROLLER AND FOLLOW FOCUS SYSTEM

TECHNICAL FIELD

The present disclosure relates to the technical field of photographic auxiliary apparatus, in particular to a follow focus controller and a follow focus system.

BACKGROUND

A follow focus system, as one of the many photographic auxiliary apparatuses, is mainly configured to control a focus of a lens in real time during a shooting process of a photographic device, which is more accurate and stable than the traditional hand-twisted lens.

The follow focus system mainly includes a follow focus controller and a follow focus driver (also called a follow focus motor). The follow focus driver is assembled at the lens during in use. Users operate the follow focus controller, the follow focus controller sends a follow focus control signal to the follow focus driver, and the follow focus driver drives the lens to rotate according to the received follow focus control signal, thereby completing lens focusing or zooming.

Currently, if a plurality of follow focus motors need to be controlled, it needs to configure a plurality of follow focus controllers, or the follow focus controller switches to control the plurality of follow focus motors, which is time-consuming and inconvenient to assemble and operate the follow focus controller.

SUMMARY

The present disclosure provides a follow focus controller and a follow focus system, to solve the technical problem that it is time-consuming and inconvenient to assemble and operate the follow focus controller in the case that a plurality of follow focus motors need to be controlled.

To realize the above objective, the present disclosure provides a follow focus controller, including:
  a body;
  a first follow focus adjusting assembly and a second follow focus adjusting assembly, arranged on the body; and
  a control assembly, arranged on the body and configured to generate a first follow focus control signal according to a rotation of the first follow focus adjusting assembly or to generate a second follow focus control signal according to a rotation of the second follow focus adjusting assembly, the first follow focus control signal and the second follow focus control signal being configured to control different follow focus motors to work.

The present disclosure further provides a follow focus system, including follow focus motors, and the foregoing follow focus controller. The follow focus controller is in communication connection with the follow focus motors, to control the follow focus motors to work.

The follow focus controller provided in the present disclosure can be communicatively connected with a plurality of follow focus motors. The control assembly can generate the first follow focus control signal when the first follow focus adjusting assembly rotates, and generate the second follow focus control signal when the second follow focus adjusting assembly rotates. Further, the follow focus controller can send the first follow focus control signal and the second follow focus control signal to different follow focus motors to control the different follow focus motors to work. In this way, at least two follow focus motors can be controlled by controlling the first follow focus adjusting assembly and the second first follow focus adjusting assembly of the follow focus controller, thereby improving the one-to-many operation performance and focusing effect. Compared with the configuration of multiple follow focus controllers, the present follow focus controller is simple in assembly, time-saving and convenient in use, and there is no need to switch control frequently, which saves the operation time and is convenient to operate.

DETAILED DESCRIPTION OF THE EMBODIMENTS

Figure 1:
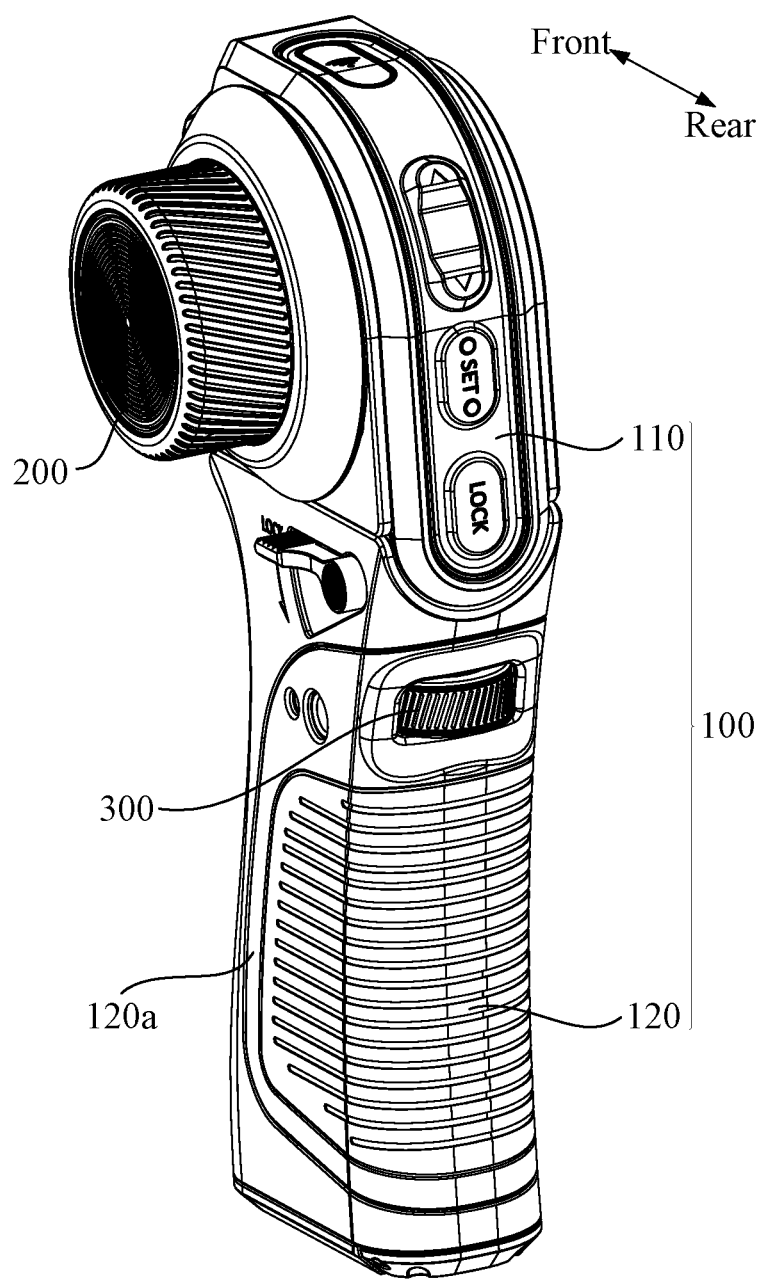
FIG. 1 is a schematic structural diagram of a follow focus controller according to an embodiment of the present disclosure.

The technical solutions in the embodiments of the present disclosure will be described clearly and completely with reference to the accompanying drawings in the embodiments of the present disclosure. Obviously, the described embodiments are only a part of the embodiments of the present disclosure rather than all of them. Based on the embodiments in the present disclosure, all other embodiments obtained by those skilled in the art without creative work shall fall within the scope of protection of the present disclosure.

It should be noted that all directional indications (such as up, down, left, right, front, back) in the embodiments of the present disclosure are merely used to explain relative position relationships or motion conditions between the components in a specific attitude (as shown in the drawings). The directional indication changes as the specific attitude changes.

It should be noted that when an element is described as "being fixed on" or "being arranged on" another element, the element may be directly arranged on the another element or there may be an intermediate element. When an element is described as "being connected to" another element, the element may be directly connected to the another element or there may be an intermediate element.

Moreover, the terms "first", "second", and the like in the present disclosure are merely used for description and cannot be understood as indicating or implying their relative importance or as implicitly indicating the quantity of the technical features indicated. Thus, the feature defined by "first" or "second" may explicitly or implicitly include at least one such feature. In addition, the technical solutions of various embodiments may be combined with each other, but must be based on that the combined technical solutions can be implemented by those skilled in the art. When the combination of the technical solutions is contradictory or impossible to realize, it shall be considered that such combination does not exist and is not within the scope of protection of the present disclosure.

Figure 2:
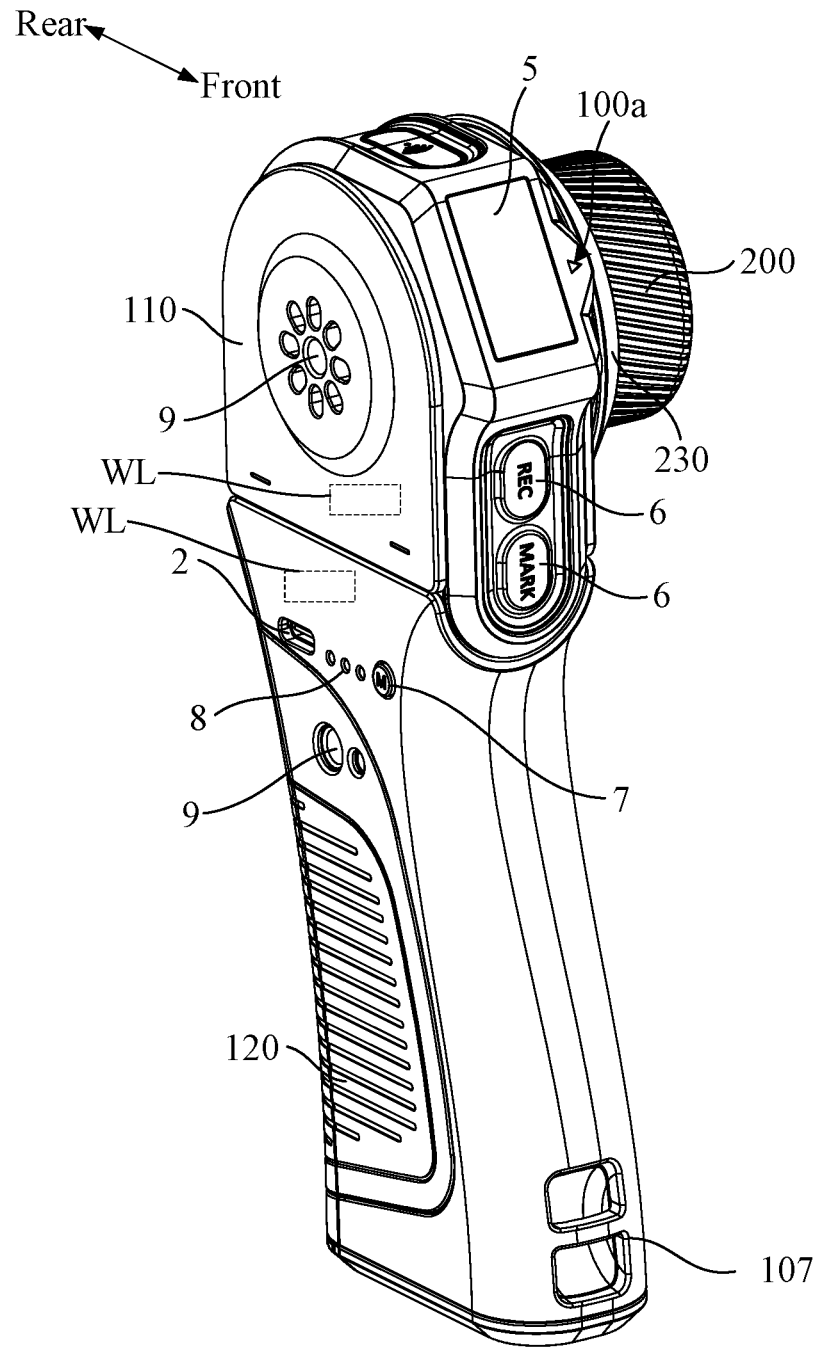
FIG. 2 is a schematic structural diagram of the follow focus controller in FIG. 1 from another view.

The present disclosure provides a follow focus controller, configured to communicate with a follow focus motor. Referring to FIG. 1 to FIG. 2, the follow focus controller includes:

a body 100;

a first follow focus adjusting assembly 200 and a second follow focus adjusting assembly 300, arranged on the body 100; and a control assembly 400, arranged on the body 100 and configured to generate a first follow focus control signal according to a rotation of the first follow focus adjusting assembly 200 or to generate a second follow focus control signal according to a rotation of the second follow focus adjusting assembly 300. The first follow focus control signal and the second follow focus control signal are configured to control different follow focus motors to work.

The follow focus controller provided in the embodiments may be served as a component of a follow focus system and is communicated to different follow focus motors. Users may operate the follow focus controller to control the follow focus motors to work, and the follow focus motors will then drive camera lenses to rotate to complete lens focusing or zooming. The communication connection between the follow focus controller and the follow focus motors may be wired or wireless, depending on an actual situation.

The follow focus controller includes the body 100, the first follow focus adjusting assembly 200, the second follow focus adjusting assembly 300, and the control assembly 400. The structure and shape of the body 100 may be set according to an actual situation, which are not limited herein. For example, the body 100 may be in a shape of a handle, an oval, or the like. The first follow focus adjusting assembly 200 and the second follow focus adjusting assembly 300 may be exposed outside the body 100 for users to operate. The first follow focus adjusting assembly 200 and the second follow focus adjusting assembly 300 may have the same or different structures. In addition, the positions of the first follow focus adjusting assembly 200 and the second follow focus adjusting assembly 300 on the body 100 may be set according to an actual requirement. For example, as shown in FIG. 1, the first follow focus adjusting assembly 200 and the second follow focus adjusting assembly 300 are arranged on different sides of the body 100, for example, the first follow focus adjusting assembly 200 is located on the upper part of the body 100, and the second follow focus adjusting assembly 300 is located on the middle part of the body 100. The control assembly 400 may be arranged in the body 100. The control assembly 400 generates the follow focus control signal according to the rotation of the corresponding follow focus adjusting assembly, and the corresponding follow focus motor is controlled to work when receiving the follow focus control signal, so as to drive the camera device lens to rotate.

In an actual application, the follow focus controller may be communicated with only one follow focus motor. In this case, users may turn the first follow focus adjusting assembly 200 or the second follow focus adjusting assembly 300, the control assembly 400 generates the first follow focus control signal or the second follow focus control signal, and the follow focus motor receives the first follow focus control signal or the second follow focus control signal to work. Alternatively, the follow focus controller may be communicated with two different follow focus motors. In this case, users may turn the first follow focus adjusting assembly 200, and one of the two follow focus motors receives the first follow focus control signal to work; and users may turn the second follow focus adjusting assembly 300, and the other follow focus motor receives the second follow focus control signal to work.

That is, the present follow focus controller can be communicated with multiple follow focus motors. The control assembly 400 may generate the first follow focus control signal when the first follow focus adjusting assembly 200 rotates, and the control assembly 400 may generate the second follow focus control signal when the second follow focus adjusting assembly 300 rotates. The follow focus controller may send the first follow focus control signal and the second follow focus control signal to different follow focus motors, to control the different follow focus motors to work. At least two follow focus motors can be controlled to work by operating the first follow focus adjusting assembly 200 and the second follow focus adjusting assembly 300 of the present follow focus controller, which improves one-to-many operation performance and focusing effect. Compared with the configuration of multiple follow focus controllers, the present follow focus controller is simple in assembly, time-saving and convenient in use, and there is no need to switch control frequently, which saves the operation time and is convenient to operate.

In some other embodiments, in addition to the first follow focus adjusting assembly 200 and the second follow focus adjusting assembly 300, the follow focus controller may further include a third follow focus adjusting assembly or even a fourth adjusting assembly for controlling more follow focus motors. That is, those skilled in the art can appropriately increase the number of the follow focus adjustment assemblies based on the basic solution of the present disclosure according to actual needs.

In some embodiments, referring to FIG. 1 to FIG. 6, the body 100 includes a first body 110 and a second body 120. The first body 110 is detachably assembled to the second body 120. The first follow focus adjusting assembly 200 is arranged on the first body 110, and the second follow focus adjusting assembly 300 is arranged on the second body 120.

In some embodiments, the first body 110 is roughly rectangular. The first follow focus adjusting assembly 200 is arranged on the first body 110, such as on a side of the first body 110. For example, the first follow focus adjusting assembly 200 is arranged on the left or right side of the first body 110 in a normal use state.

In the embodiments, the body 100 is a detachable structure, that is, the first body 110 detachably assembled to the second body 120. The first follow focus adjusting assembly 200 is arranged on the first body 110, and the second follow focus adjusting assembly 300 is arranged on the second body 120. Users may rotate the first follow focus adjusting assembly 200 on the first body 110 for follow focus adjustment control, or rotate the second follow focus adjusting assembly 300 on the second body 120 for follow focus adjustment control. In case the first body 110 is assembled to the second body 120, the follow focus controller can be used as one follow focus controller; in case the first body 110 is detached from the second body 120, the present follow focus controller can be split into two, and the first body 110 and the second body 120 can be used as two follow focus controllers respectively. That is, the present follow focus controller can be used as one or two follow focus controllers according to an actual requirement, which meets more usage scenarios, thereby improving the user experience.

Further, the structures and shapes of the first body 110 and the second body 120 may be set according to an actual situation, which are not limited herein. In some embodiments, in case the first body 110 is assembled to the second body 120, the first body 110 may be located on the upper side, the lower side, the left side, the right side, the front side or the rear side of the second body 120, which is not limited herein. In addition, the first body 110 is detachably assembled to the second body 120 by a snap-fit connection, a magnetic attraction connection, or the like, which is not limited herein.

Figure 4:
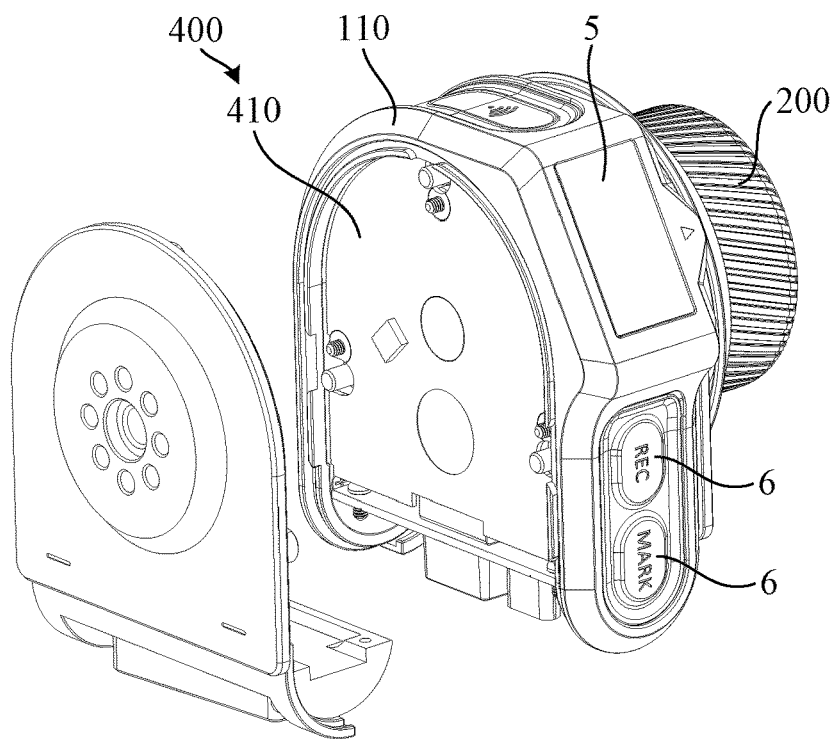
FIG. 4 is a first exploded diagram of the first body of the follow focus controller in FIG. 1.
Figure 6:
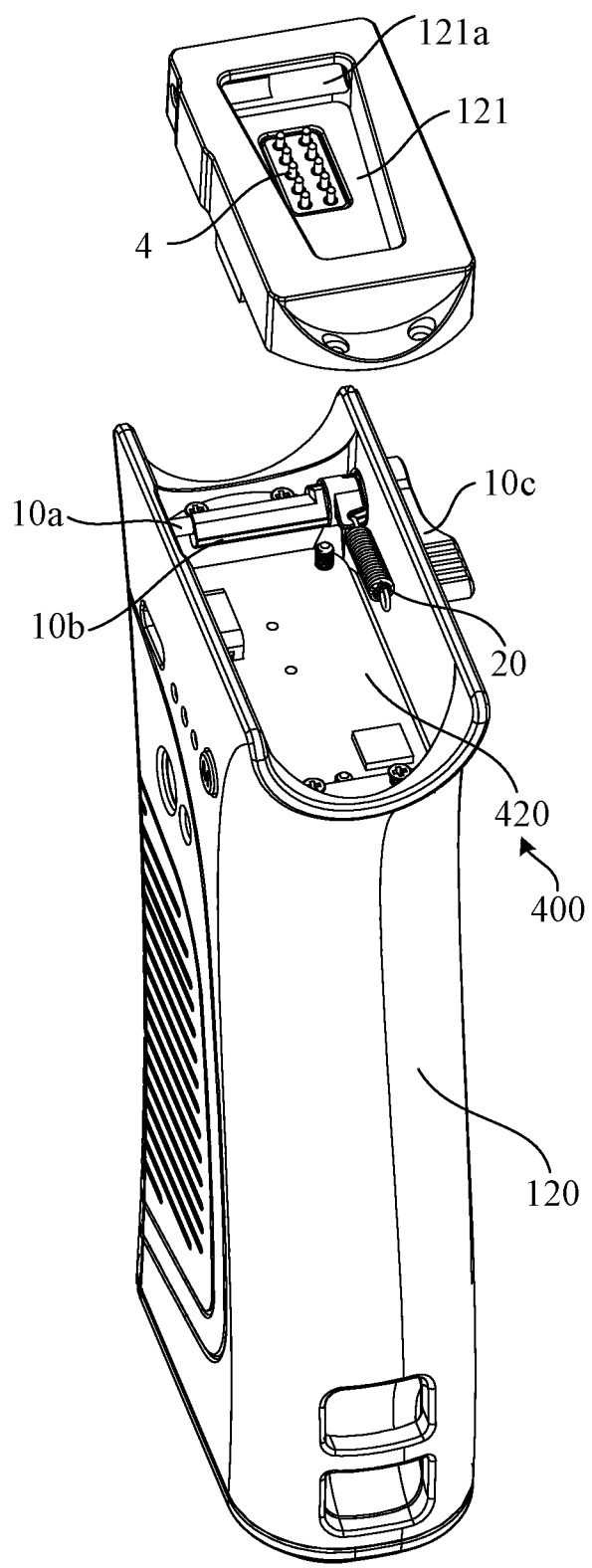
FIG. 6 is a first exploded diagram of the second body of the follow focus controller in FIG. 1.

In some embodiments, referring to FIG. 4 and FIG. 6, the control assembly 400 includes:
 a first control circuit board 410, arranged on the first body 110, and configured to generate the first follow focus control signal according to the rotation of the first follow focus adjusting assembly 200; and
 a second control circuit board 420, arranged on the second body 120, and configured to generate the second follow focus control signal according to the rotation of the second follow focus adjusting assembly 300.

The first control circuit board 410 is electrically connected to the second control circuit board 420 when the first body 110 is assembled to the second body 120.

In the embodiments, the control assembly 400 includes the first control circuit board 410 and the second control circuit board 420. The first control circuit board 410 is arranged on the first body 110 corresponding to the first follow focus adjusting assembly 200, and generates the first follow focus control signal in response to a rotation of the first follow focus adjusting assembly 200. The second control circuit board 420 is arranged on the second body 120 corresponding to the second follow focus adjusting assembly 300, and generates the second follow focus control signal in response to a rotation of the second follow focus adjusting assembly 300.

In case the first body 110 is assembled to the second body 120, namely, the present follow focus controller is served as one follow focus controller, the first control circuit board 410 on the first body 110 is electrically connected to the second control circuit board 420 on the second body 120, with data being transmitted therebetween to realize data intercommunication. For example, when the first follow focus adjusting assembly 200 on the first body 110 rotates, the first follow focus control signal generated by the first control circuit board 410 may be transmitted to the second control circuit board 420 and output by the second body 120; or, when the second follow focus adjusting assembly 300 on the second body 120 rotates, the second follow focus control signal generated by the second control circuit board 420 may be transmitted to the first control circuit board 410 and output by the first body 110.

Figure 3:
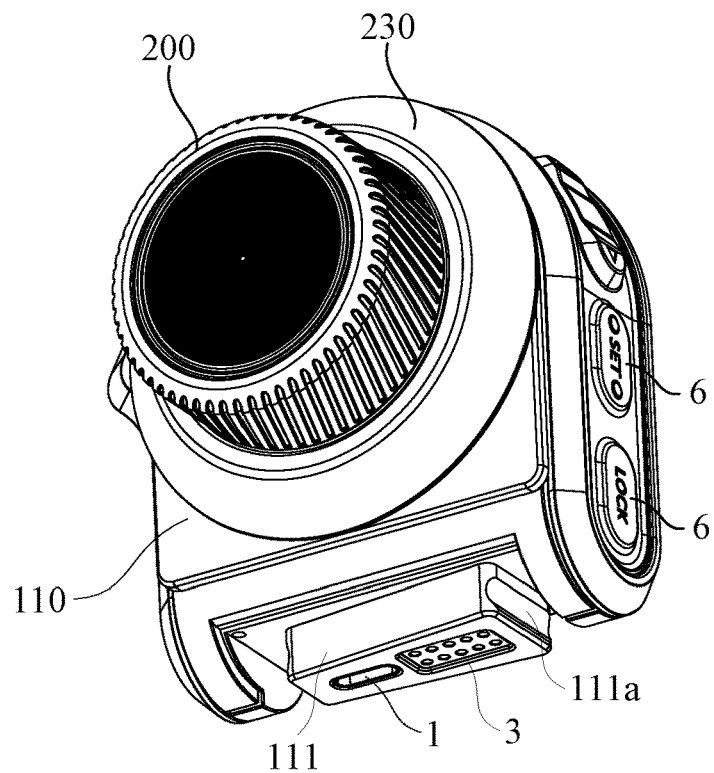
FIG. 3 is a schematic structural diagram of a first body of the follow focus controller in FIG. 1.

In some embodiments, referring to FIG. 2 and FIG. 3, a wireless module WL is arranged on the first body 110 or the second body 120. The wireless module WL is electrically connected to the first control circuit board 410 and/or the second control circuit board 420 to send the follow focus control signal to the follow focus motor; and/or
 a first interface 1 electrically connected to the first control circuit board 410 is arranged on the first body 110; and/or
 a second interface 2 electrically connected to the second control circuit board 420 is arranged on the second body 120.

In the embodiments, the first body 110 or the second body 120 may be communicated with the follow focus motor through the wireless module WL, to send the first follow focus control signal output by the first control circuit board 410 or the second follow focus control signal output by the second control circuit board 420 to the follow focus motor. In some other embodiments, the first body 110 or the second body 120 may be communicated with a mobile terminal (such as a mobile phone, a tablet computer) or other devices through the wireless module WL for mutual data transmission and information sharing. The wireless module WL may be a ZigBee module, a Bluetooth module, a WIFI module, or the like.

The first body 110 may be provided with the first interface 1 electrically connected to the first control circuit board 410. The first interface 1 may be a charging interface. In case the first body 110 has a built-in battery and the battery level is insufficient, the first body 110 is charged by an external power source that connects to the first interface 1. The first interface 1 may also be a communication interface for communicating with the follow focus motor through a data line to realize signal data transmission. The type of the first interface 1 is not limited herein. For example, the first interface 1 is a Type-B interface, a Type-C interface, or the like.

The second body 120 may be provided with the second interface 2 electrically connected to the second control circuit board 420. The second interface 2 may be a charging interface. In case the second body 120 has a built-in battery and the battery level is insufficient, the second body 120 is charged by an external power source that connects to the second interface 2. The second interface 2 may also be a communication interface for communicating with the follow focus motor through a data line to realize signal data transmission. The type of the second interface 2 is not limited herein. For example, the second interface 2 is a Type-B interface, a Type-C interface, or the like.

Figure 5:
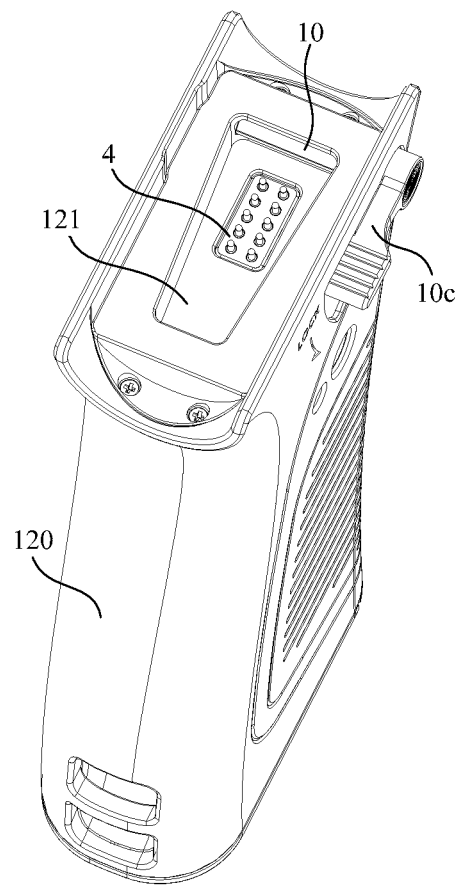
FIG. 5 is a schematic structural diagram of a second body of the follow focus controller in FIG. 1.

In some embodiments, referring to FIG. 3 and FIG. 5, a conductive interface 3 electrically connected to the first control circuit board 410 is arranged on the first body 110, and a conductive connector 4 electrically connected to the second control circuit board 420 is arranged on the second body 120.

When the first body 110 is assembled to the second body 120, the conductive connector 4 is inserted into the conductive interface 3, allowing the first control circuit board 410 to be electrically connected to the second control circuit board 420.

In the embodiments, the conductive interface 3 on the first body 110 is electrically connected to the first control circuit board 410, and the conductive connector 4 on the second body 120 is electrically connected to the second control circuit board 420. When the first body 110 is assembled to the second body 120 for use, the conductive connector 4 on the second body 120 is inserted into the conductive interface 3 on the first body 110, to allow the first control circuit board 410 to be electrically connected to the second control circuit board 420. The types of the conductive connector 4 and the conductive interface 3 are not limited herein. For example, the conductive connector 4 is a PIN connector, and correspondingly the conductive interface 3 is a PIN interface.

In some embodiments, referring to FIG. 3 and FIG. 5, the first body 110 is provided with a connection portion 111, and the second body 120 is defined with a connection slot 121 matched to the connection portion 111. The connection portion 111 is inserted into and fastened in the connection slot 121, to allow the first control circuit board 410 to be electrically connected to the second control circuit board 420.

In the embodiments, the first body 110 is assembled to the second body 120 by inserting and fastening the connection portion 111 into the connection slot 121. The shape of the connection slot 121 is matched to the outer contour of the connection portion 111. In some embodiments, the connection portion 111 has a trapezoidal cross section that one side is wide and the other side is narrow. Correspondingly, the width of the connection slot 121 decreases from one side to the other side. Therefore, it is convenient for users to dock the connection portion 111 with the connection slot 121 quickly and accurately when assembling the first body 110 and the second body 120, so as to prevent the installation of the first body 110 on the second body 120 from being incorrect. When the connection portion 111 is inserted into and fastened in the connection slot 121, the conductive connector 4 on the first body 110 is automatically inserted into the conductive interface 3 on the second body 120, to allow the first control circuit board 410 to be electrically connected with the second control circuit board 420. When the connection portion 111 is pulled out of the connection slot 121, the conductive connector 4 is automatically disconnected with the conductive interface 3, to allow the first control circuit board 410 to be electrically disconnected with the second control circuit board 420. The positions of the conductive interface 3 and the conductive connector 4 are not limited herein. In some embodiments, the conductive interface 3 is arranged on an end surface of the connection portion 111 facing the bottom wall of the connection slot 121, and the conductive connector 4 is arranged on the bottom wall of the connection groove 121.

In some embodiments, a side wall of the connection portion 111 is defined with a notch 111a, and a side wall of the connection slot 121 is defined with an opening 121a. A locking component 10 is arranged on the second body 120. The locking component 10 passes through the opening 121a and extends into the notch 111a to lock the connection portion 111 or retreat from the notch 111a to release the connection portion 111.

In the embodiments, when the first body 110 is assembled to the second body 120, the connection portion 111 of the first body 110 is inserted into the connection slot 121 of the second body 120, and the locking component 10 extends into the notch 111a of the connection portion 111, so that the connection portion 111 is in a locked state and cannot be separated from the connection slot 121, completing the assembly of the first body 110 and the second body 120. When the first body 110 is disassembled from the second body 120, the locking component 10 retreats from the notch 111a of the connection portion 111 to release the connection portion 111, and the connection portion 111 of the first body 110 is pulled out of the connection slot 121 of the second body 120, completing the disassembly of the first body 110 and the second body 120.

The locking component 10 may has a regular shape or an irregular shape, and the locking component 10 may be rotatably or slidably arranged on the second body 120, which may be set according to an actual situation. The connection portion 111 of the first body 110 cannot be pulled out of the connection slot 121 of the second body 120 by way of the locking effect of the locking component 10, thereby improving the stability of the installation of the first body 110 on the second body 120.

In some embodiments, referring to FIG. 6, the locking component 10 includes a rotation portion 10a and a clamping portion 10b connected to the rotation portion 10a. The rotation portion 10a is rotatably arranged on the second body 120. The clamping portion 10b rotates with the rotation portion 10a to extend into or retreat from the notch 111a.

A first reset component 20 is further arranged on the second body 120. One end of the first reset component 20 is connected to the rotation portion 10a to reset the rotation portion 10a.

In the embodiments, the locking process is: users operate to allow the rotation portion 10a to rotate, the clamping portion 10b rotates with the rotation portion 10a, or the connection portion 111 is directly inserted into the connection slot 121 to push the clamping portion 10b to rotate, so that the clamping portion 10b leaves the locking position; after the connection portion 111 is inserted in position in the connection slot 121, the rotation portion 10a rotates and resets under the action of the first reset component 20, and the clamping portion 10b rotates with the rotation portion 10a to reach the locking position, that is, the clamping portion 10b extends into the notch 111a of the connection portion 111 to be locked. The unlocking process is: users operate the rotation portion 10a to rotate, and the clamping portion 10b rotates with the rotation portion 10a, so that the clamping portion 10b leaves the locking position, that is, the clamping portion 10b retreats from the notch 111a of the connection portion 111 to be unlocked.

In some embodiments, the first reset component 20 is a spring. One end of the spring is connected to the rotation portion 10a, and the other end of the spring is fixed.

In some embodiments, one end of the rotation portion 10a passes out through the outer side wall of the second body 120 and is connected with a pulling portion 10c. In the embodiments, the pulling portion 10c extends along the radial direction of the rotation portion 10a, such that users can pull the pulling portion 10c to rotate the rotation portion 10a, which is simple and convenient to operate.

In some embodiments, referring to FIG. 2 and FIG. 4, a display screen 5 electrically connected to the first control circuit board 410 is arranged on the first body 110; and/or, at least one first control button 6 electrically connected to the first control circuit board 410 is arranged on the first body 110.

In the embodiments, the first body 110 may be provided with the display screen 5 electrically connected to the first control circuit board 410. The display screen 5 may display working information of the follow focus controller, such as a current follow focus angle parameter, battery level information, and the like, which facilitates human-computer interaction. The display screen 5 may be a non-touch screen or a touch screen, which is set according to an actual situation.

The first body 110 may be provided with the first control button 6 to realize follow focus control in combination with the operation of the first control button 6. A plurality of first control buttons 6 may be provided, and the plurality of first control buttons 6 may include switch buttons and function buttons such as recording (REC) buttons. The types, quantity, and positions of the first control buttons 6 are not limited, which may be set according to an actual situation.

In some embodiments, in case the first body 110 is used alone, the display screen 5 displays information about the operation of the first body 110; in case the first body 110 is used in combination with the second body 120, the display screen 5 displays information about the operation of the first body 110 and/or the second body 120.

In the embodiments, in case the first body 110 is used alone, the display screen 5 can only display working information of the first body 110. In case the first body 110 is used in combination with the second body 120, the first control circuit board 410 is electrically connected to the second control circuit board 420, thus data can be transmitted therebetween to realize data communication. Therefore, the display screen 5 can display the working information of at least one of the first body 110 and the second body 120.

In some embodiments, referring to FIG. 2, at least one second control button 7 electrically connected to the second control circuit board 420 is arranged on the second body 120; and/or an indicator light 8 electrically connected to the second control circuit board 420 is arranged on the second body 120.

In the embodiments, the second body 120 may be provided with the second control button 7 to realize follow focus control in combination with the operation of the second control button 7. A plurality of second control buttons 7 may be provided, and the plurality of second control buttons 7 may include switch buttons and the like. The types, quantity, and positions of the second control buttons 7 are not limited, which may be set according to an actual situation.

In the embodiments, the second body 120 may be provided with the indicator light 8, which is exposed to the outer surface of the second body 120 and electrically connected to the second control circuit board 420. There may be one or more than one indicator light, which is not limited herein. The indicator light 8 may have various indication functions, such as flashing alert when the battery level is insufficient.

In some embodiments, a first battery b1 is arranged in the first body 110 and electrically connected to the first control circuit board 410; and/or a second battery b2 is arranged in the second body 120 and electrically connected to the second control circuit board 420.

In the embodiments, the first battery b1 is arranged in the first body 110 and is electrically connected to the first control circuit board 410 to supply power to the first control circuit board 410, and may further supply power to other electronic components electrically connected to the first control circuit board 410 through the first control circuit board 410. Correspondingly, the second battery b2 is arranged in the second body 120 and is electrically connected to the second control circuit board 420 to supply power to the second control circuit board 420, and may further supply power to other electronic components electrically connected to the second control circuit board 420 through the second control circuit board 420. The types, capacities, shapes, and sizes of the first battery and the second battery b2 are not limited herein, which may be set according to an actual situation.

In case the first body 110 is assembled to the second body 120, the second battery b2 in the second body 120 can supply power to the first body 110 in case the first body 110 is out of power; and the first battery b1 in the first body 110 can supply power to the second body 120 in case the second body 120 is out of power.

Figure 7:
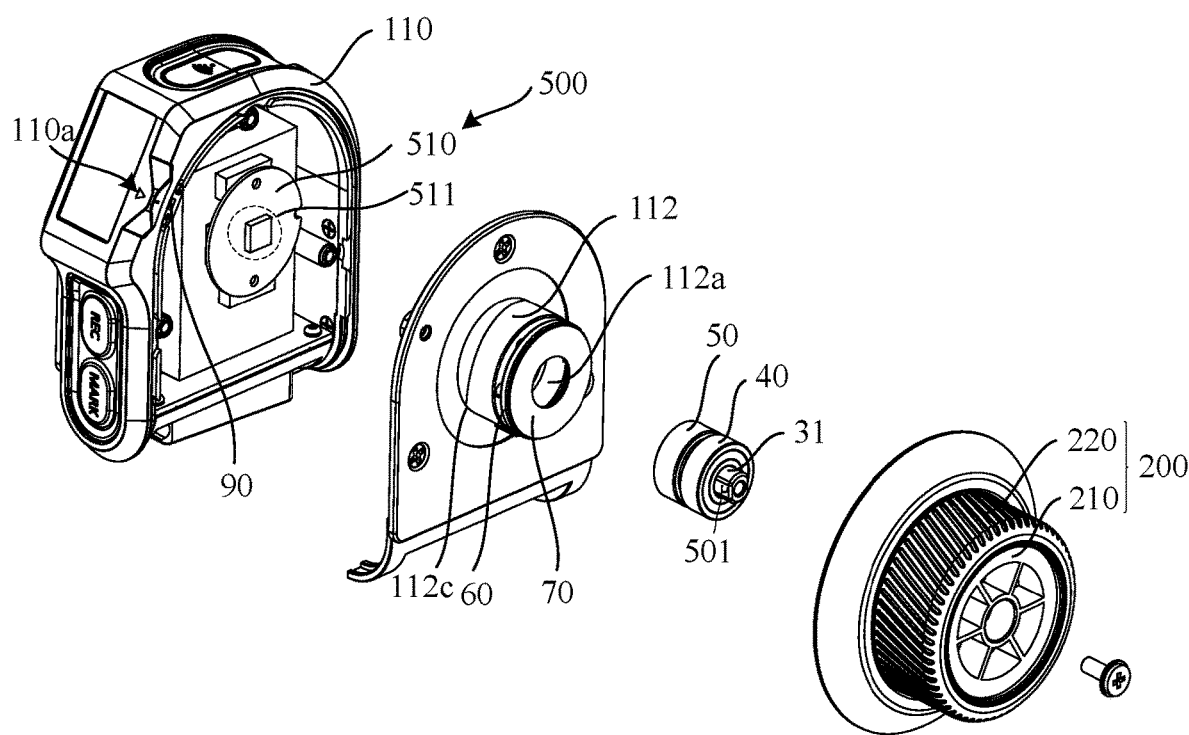
FIG. 7 is a second exploded diagram of the first body of the follow focus controller in FIG. 1.
Figure 8:
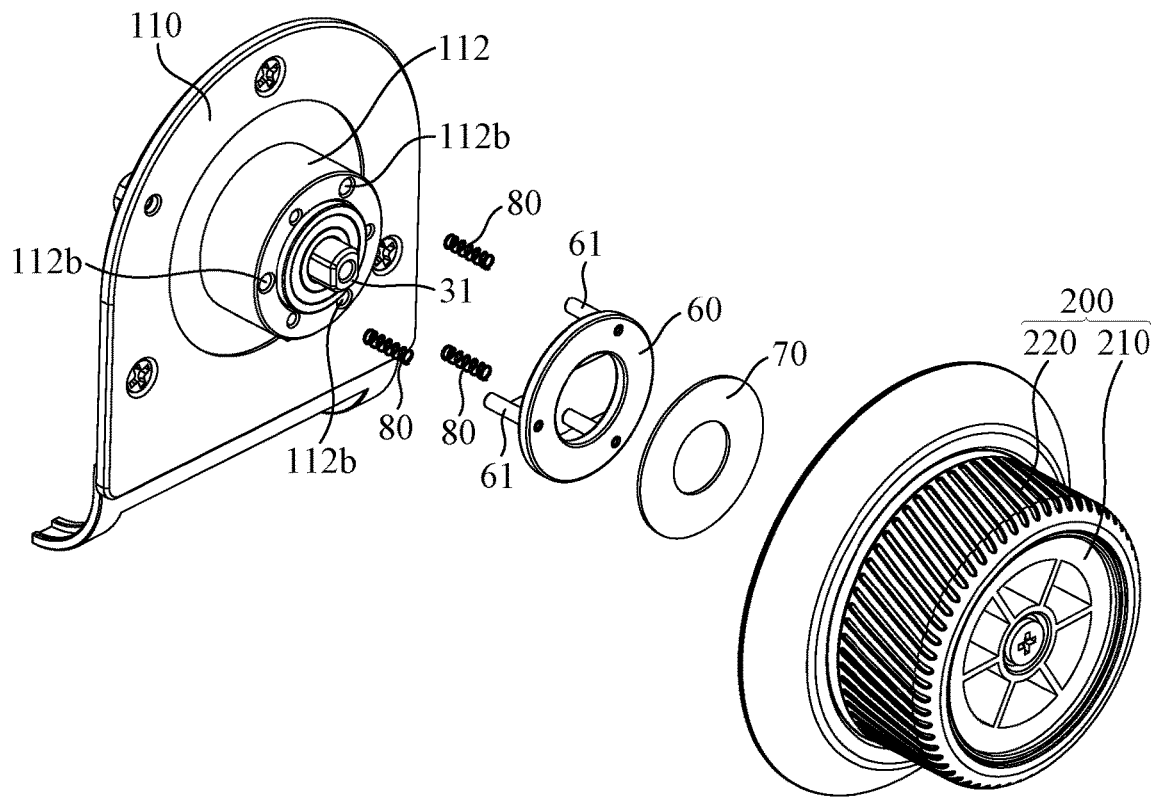
FIG. 8 is a third exploded diagram of the first body of the follow focus controller in FIG. 1.

In some embodiments, referring to FIG. 7 and FIG. 8, the first follow focus adjusting assembly 200 includes:
  an adjustment knob 210, rotatably arranged on a side of the first body 110. The rotation of the adjustment knob 210 causes the first control circuit board 410 to generate the first follow focus control signal that includes rotation angle information of the adjustment knob 210, and the follow focus motor rotates to perform follow focus adjustment based on the first follow focus control signal.

In the embodiments, the first follow focus adjusting assembly 200 includes the adjustment knob 210. The follow focus adjustment can be realized by the rotation of the adjustment knob 210. In particular, when the adjustment knob 210 rotates, the first control circuit board 410 correspondingly generates the first follow focus control signal that includes the rotation angle information of the adjustment knob 210, and then sends the first follow focus control signal to the follow focus motor via wireless or wired means to control the follow focus motor. The adjustment knob 210 may be mounted on the first body 110 by a mounting component (such as a mounting shaft, a bearing) and is rotatably arranged.

In some embodiments, referring to FIG. 7, the follow focus controller further includes:
  a first detection assembly 500, arranged on the first body 110 and electrically connected to the first control circuit board 410, and configured to detect the rotation angle of the adjustment knob 210.

In the embodiments, the first detection assembly 500 detects the rotation angle of the adjustment knob 210, and sends the detected rotation angle data to the first control circuit board 410. The first control circuit board 410 generates the first follow focus control signal that includes the rotation angle information of the adjustment knob 210 according to the rotation angle data. The first detection assembly 500 may be any angle sensor or encoder suitable for the present solution, which is not limited herein.

In some embodiments, referring to FIG. 7 and FIG. 8, a first rotation shaft 31 is rotatably arranged on the first body 110, and the adjustment knob 210 is connected with the first rotation shaft 31. The first detection assembly 500 includes:
  a first magnetic induction component, arranged on the first rotation shaft 31; and
  a first detection circuit board 510, arranged in the first body 110. The first detection circuit board 510 is provided with a first magnetic encoder chip 511, which is arranged facing the first magnetic induction component. The first magnetic encoder chip 511 calculates the rotation angle of the adjustment knob 210 by sensing a change of the magnetic field between the first magnetic encoder chip 511 and the first magnetic induction component.

In the embodiments, the adjustment knob 210 is connected to the first rotation shaft 31, and the first rotation shaft 31 rotates with the rotation of the adjustment knob 210. The first detection assembly 500 detects the rotation angle of the first rotation shaft 31 to obtain the rotation angle of the adjustment knob 210. In some embodiments, the adjustment knob 210 is directly or indirectly connected to the first rotation shaft 31, which is not limited herein. In case the adjustment knob 210 is directly connected to the first rotation shaft 31, the adjustment knob 210 is rotatably arranged on the first body 110 by means of the first rotation shaft 31, and directly drives the first rotation shaft 31 to rotate. In case the adjustment knob 210 is indirectly connected to the first rotation shaft 31, the adjustment knob 210 drives the first rotation shaft 31 to rotate by means of a transmission structure.

The first detection assembly 500 includes the first magnetic induction component and the first detection circuit board 510. When the adjustment knob 210 rotates to drive the first rotation shaft 31 to rotate, the first magnetic induction component rotates with the first rotation shaft 31, causing the magnetic field between the first magnetic induction component and the first magnetic encoder chip on the first detection circuit board 510 to change. The first magnetic encoder chip calculates the rotation angle of the first rotation shaft 31 based on the change of the magnetic field acquired, to obtain the rotation angle of the adjustment knob 210. In particular, the first detection circuit board 510 of the first detection assembly 500 is electrically connected to the first control circuit board 410. In some embodiments, the first detection circuit board 510 is integrated in the first control circuit board 410. The first detection circuit board 510 is integrally designed with the first control circuit board 410, which makes the structure compact.

In some embodiments, referring to FIG. 7 and FIG. 8, a side of the first body 110 is protruded outward to provide a mounting portion 112. The first rotation shaft 31 is mounted on the mounting portion 112. An end of the first rotation shaft 31 is located in the mounting portion 112, and the other end of the first rotation shaft 31 protrudes from the mounting portion 112. The adjustment knob 210 is sleeved on the mounting portion 112 and connected to the other end of the first rotation shaft 31.

In the embodiments, a side of the first body 110 is provided with the mounting portion 112. The adjustment knob 210 is mounted on the mounting portion 112 of the first body 110 by the first rotation shaft 31, thereby realizing the arrangement on the first body 110. The mounting portion 112 may be cylindrical as shown in FIG. 7, and the mounting portion 112 may be substantially located on the central axis of the first body 110, which are not limited herein. The mounting portion 112 may be integrally formed with the first body 110, which increases the structural strength and thereby improving the mounting stability of the adjustment knob 210. In some embodiments, the first rotation shaft 31 is rotatably arranged on the mounting portion 112 by a bearing. One or more bearings may be provided, which is set according to an actual situation. In some embodiments, the adjustment knob 210 is connected to the first rotation shaft 31 by a screw. The other end of the first rotation shaft 31 is defined with a threaded hole, the adjustment knob 210 is defined with a connection hole configured to match with the threaded hole of the first rotation shaft 31. The screw passes through the connection hole of the adjustment knob 210 and is then inserted into the threaded hole of the first rotation shaft 31 to be engaged with the thread in the threaded hole.

In some embodiments, referring to FIG. 7 and FIG. 8, a mounting cavity 112a is defined in the mounting portion 112. The first rotation shaft 31 is mounted in the mounting cavity 112a by the bearing 40. A damping ring 50 is arranged in the mounting cavity 112a, and is sleeved on the end of the first rotation shaft 31 located in the mounting cavity 112a.

In the embodiments, the bearing 40 and the damping ring 50 are successively arranged in the mounting cavity 112a along the axial direction of the first rotation shaft 31. The outer ring of the bearing 40 is in an interference fit with the wall of the mounting cavity 112a, and the first rotation shaft 31 passes through the inner ring of the bearing 40 and is in an interference fit with the bearing 40. The first rotation shaft 31 can rotate stably on the mounting portion 112 with the support of the bearing 40. The damping ring 50 abuts against the wall of the mounting cavity 112a and is sleeved on the first rotation shaft 31. The damping ring 50 is coated with damping oil between the damping ring 50 and the first rotation shaft 31. Under the effect of the damping ring 50 and the damping oil, there is a sense of stagnation when users operate the adjustment knob 210, which allows the adjustment knob 210 to rotate slowly and steadily, thereby improving the precision of the follow focus adjustment.

In some embodiments, referring to FIG. 7 and FIG. 8, a first friction sheet 60 is mounted on an end of the mounting portion 112 facing the adjustment knob 210, and a second friction sheet 70 overlapping the first friction sheet 60 is arranged in the adjustment knob 210. The mounting portion 112, the first friction sheet 60, the second friction sheet 70, and the adjustment knob 210 abut against one another.

In the embodiments, the mounting portion 112, the first friction sheet 60, the second friction sheet 70, and the adjustment knob 210 are held against each other. During the rotation of the adjustment knob 210, the second friction sheet 70 rubs against the adjustment knob 210, and the first friction sheet 60 rubs against the second friction sheet 70, thereby friction force is generated. Under the action of the friction force, there is a sense of stagnation when users operate the adjustment knob 210, which allows the adjustment knob 210 to rotate slowly and steadily, thereby improving the precision of the follow focus adjustment. In some embodiments, the first friction sheet 60 and the second friction sheet 70 are in the shape of a ring for the first rotation shaft to pass through, so as to realize structural avoidance for the first rotation shaft.

In some embodiments, referring to FIG. 7 and FIG. 8, an end of the mounting portion 112 facing the adjustment knob 210 is defined with a plurality of mounting holes 112b, and the first friction sheet 60 is provided with a plurality of mounting posts 61. Each mounting post 61 is inserted into one of the mounting holes 112b. Each mounting hole 112b is provided with an elastic component 80. One end of the elastic component 80 abuts against the bottom wall of the mounting hole 112b, and the other end of the elastic component 80 abuts against the mounting post 61. The elastic component 80 applies an elastic force to the mounting post 61, to allow the first friction sheet 60 to abut against the second friction sheet 70, and to allow the second friction sheet 70 to abut against the adjustment knob 210.

In the embodiments, in case the first friction sheet 60 is mounted on the mounting portion 112, each mounting post 61 is inserted into the corresponding mounting hole 112b. One end of the elastic component 80 abuts against the bottom wall of the mounting hole 112*b*, and the other end of the elastic component 80 abuts against the mounting post 61. In addition, the elastic component 80 is in a compressed state to continue applying the elastic force to the mounting post 61. In some embodiments, the elastic component 80 is a spring. With such a structural arrangement, the first friction sheet 60 and the second friction sheet 70 are kept in elastic contact, and the second friction sheet 70 and the adjustment knob 210 are kept in elastic contact, which improves the smoothness and stability of the adjustment knob 210 during its rotation.

Figure 21:
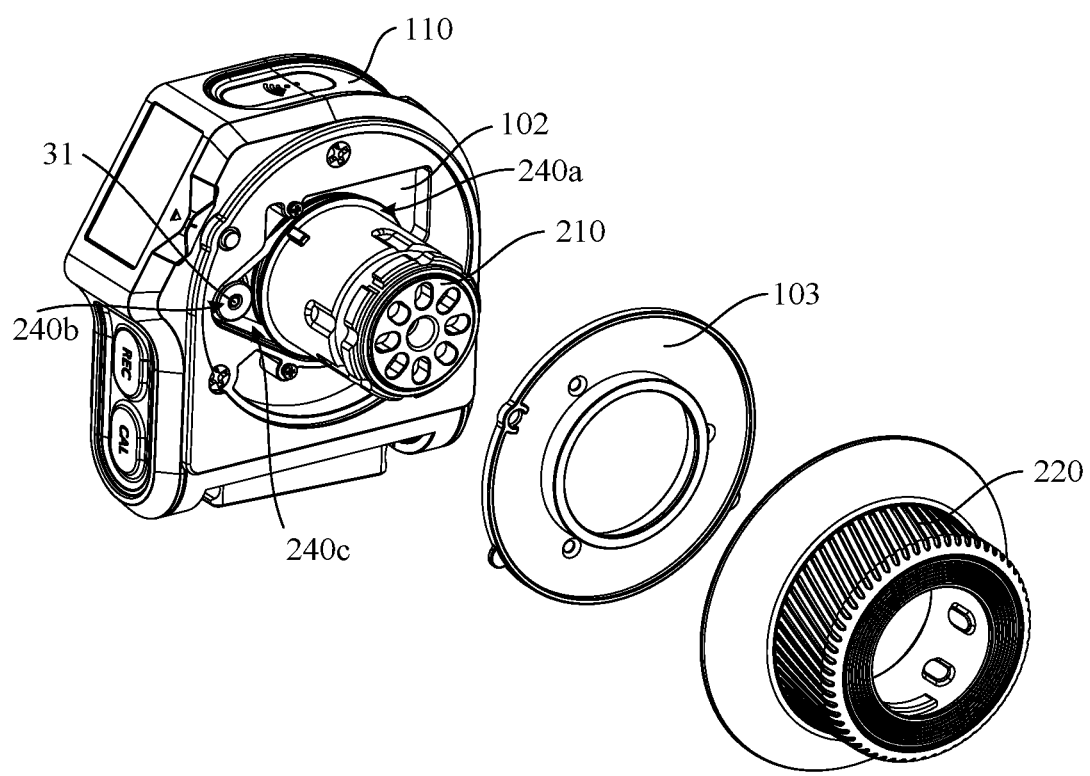
FIG. 21 is an exploded diagram of a first body according to an embodiment of the present disclosure.
Figure 22:
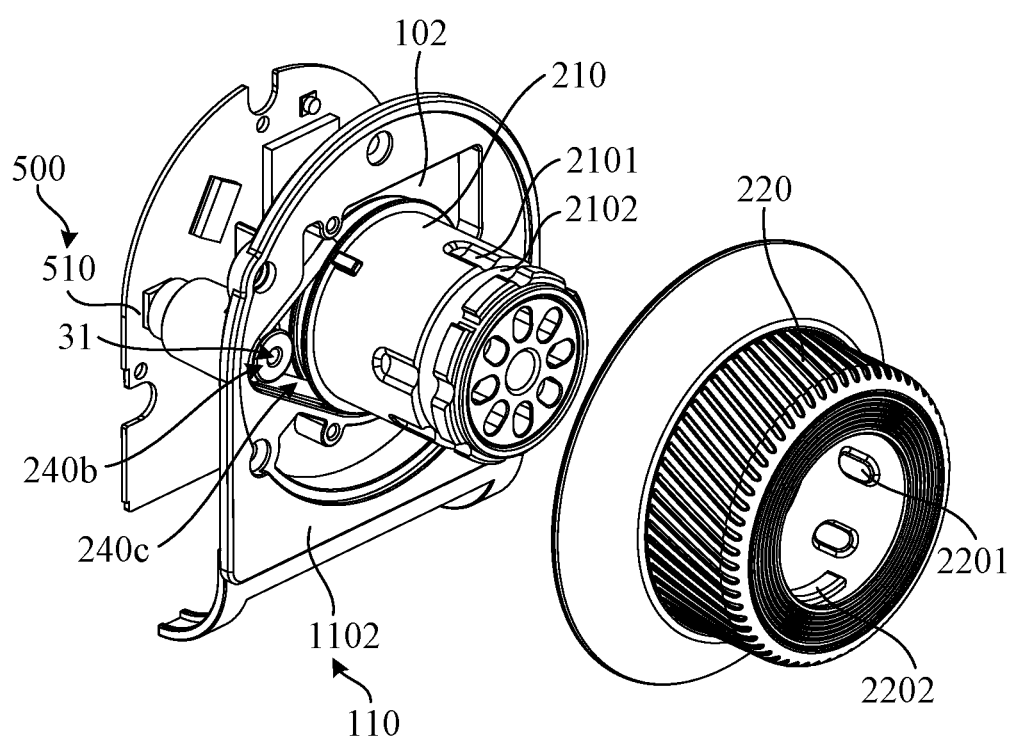
FIG. 22 is a schematic structural diagram of a part the first body in FIG. 21.

In some embodiments, referring to FIG. 21 and FIG. 22, a side of the first body 110 is recessed inward to define an accommodation slot 102. The accommodation slot 102 is arranged around the mounting portion 112. A cover plate 40 is arranged at the accommodation slot 102. The cover plate 40 covers the accommodation slot 102 and is detachably connected with the first body 110.

An end of the first rotation shaft 31 is provided with a first transmission wheel 240*a* and located in the accommodation slot 102, and the other end of the first rotation shaft 31 penetrates into the first body 110. An end of the adjustment knob 210 is provided with a second transmission wheel 240*b* and extends into the accommodation slot 102. The first transmission wheel 240*a* is connected to the second transmission wheel 240*b* by a transmission component 240*c*.

In the embodiments, the adjustment knob 210 is spaced from the first rotation shaft 31, and a transmission structure including the first transmission wheel 240*a*, the transmission component 240*c*, and the second transmission wheel 240*b* is arranged between the adjustment knob 210 and the first rotation shaft 31. When the adjustment knob 210 rotates to drive the second transmission wheel 240*b* to rotate, the first transmission wheel 240*a* and the rotation shaft 31 are rotated by the transmission of the transmission component 240*c*. The transmission component 240*c* may be a transmission belt. The transmission belt is sleeved on the first transmission wheel 240*a* and the second transmission wheel 240*b*, and can drive the first transmission wheel 240*a* to rotate when the second transmission wheel 240*b* rotates. Further, the first body 110 is recessed to define the accommodation slot 102 for receiving the first transmission wheel 240*a*, the transmission component 240*c* and the second transmission wheel 240*b*. The accommodation slot 102 may be covered by the cover plate 103 to conceal the transmission structure, which avoids a transmission interference to the transmission structure caused by the external environment, thereby improving the accuracy of the follow focus adjustment. The shape of the accommodation slot 102 is set according to an actual situation, which is not limited herein. The cover plate 103 covers the opening of the accommodation slot 102. In some embodiments, only one cover plate 103 is provided, and it is connected to the first body 110 by a fastener (such as a screw).

In some embodiments, an elastic ring 112*c* is mounted on an outer wall surface of the mounting portion 112. The elastic ring 112*c* abuts against an inner wall surface of the adjustment knob 210 to support the adjustment knob 210 to rotate.

In the embodiments, the adjustment knob 210 can rotate stably on the mounting portion 112 with the support of the elastic ring 112*c*. In some embodiments, an outer wall surface of the mounting portion 112 is defined with an annular groove, and the elastic ring 112*c* is mounted in the annular groove. The elastic ring 112*c* abuts against the inner wall surface of the adjustment knob 210 when the adjustment knob 210 is sleeved on the mounting portion 112. The quantity of the elastic rings may be set according to an actual situation. In the embodiments, only one elastic ring 112*c* is provided.

In some embodiments, referring to FIG. 7 and FIG. 8, the first follow focus adjusting assembly 200 further includes:
 a knob sleeve 220, sleeved on the adjustment knob 210 and fixed to the adjustment knob 210.

In the embodiments, the knob sleeve 220 is sleeved on the adjustment knob 210 and is fixed to the adjustment knob 210. Users operate the adjustment knob 210 by touching the knob sleeve 220 to rotate the adjustment knob 210. The knob sleeve 220 may be made of a flexible material such as silicone, which makes it more comfortable for users to operate. In addition, the knob sleeve 220 is detachable from the adjustment knob 210, which is convenient for users to replace the knob sleeve 220 according to requirements.

In some embodiments, referring to FIG. 22, an outer wall surface of the adjustment knob 210 is defined with first engaging grooves 2101 along its axial direction and second engaging grooves 2102 along its radial direction, and an inner wall surface of the knob sleeve 220 is provided with first engaging portions 2201 engaged with the first engaging grooves 2101 and second engaging portions 2202 engaged with the second engaging grooves 2102.

In the embodiments, when the knob sleeve 220 is sleeved on the adjustment knob 210 and installed in position, the first engaging portions 2201 on the inner wall surface of the knob sleeve 220 are correspondingly engaged with the first engaging grooves 2101, and the second engaging portions 2202 are correspondingly engaged with the second engaging grooves 2102. The knob sleeve 220 cannot rotate relative to the adjustment knob 210 because of the engagement between the first engaging portions 2201 and the first engaging grooves 2101; and the knob sleeve 220 cannot move relative to the adjustment knob 210 along its axial direction because of the engagement between the second engaging portions 2202 and the second engaging grooves 2102. The quantity of the first engaging grooves 2101 and the quantity of the second engaging grooves 2102 are set according to an actual situation, which are not limited herein.

Figure 9:
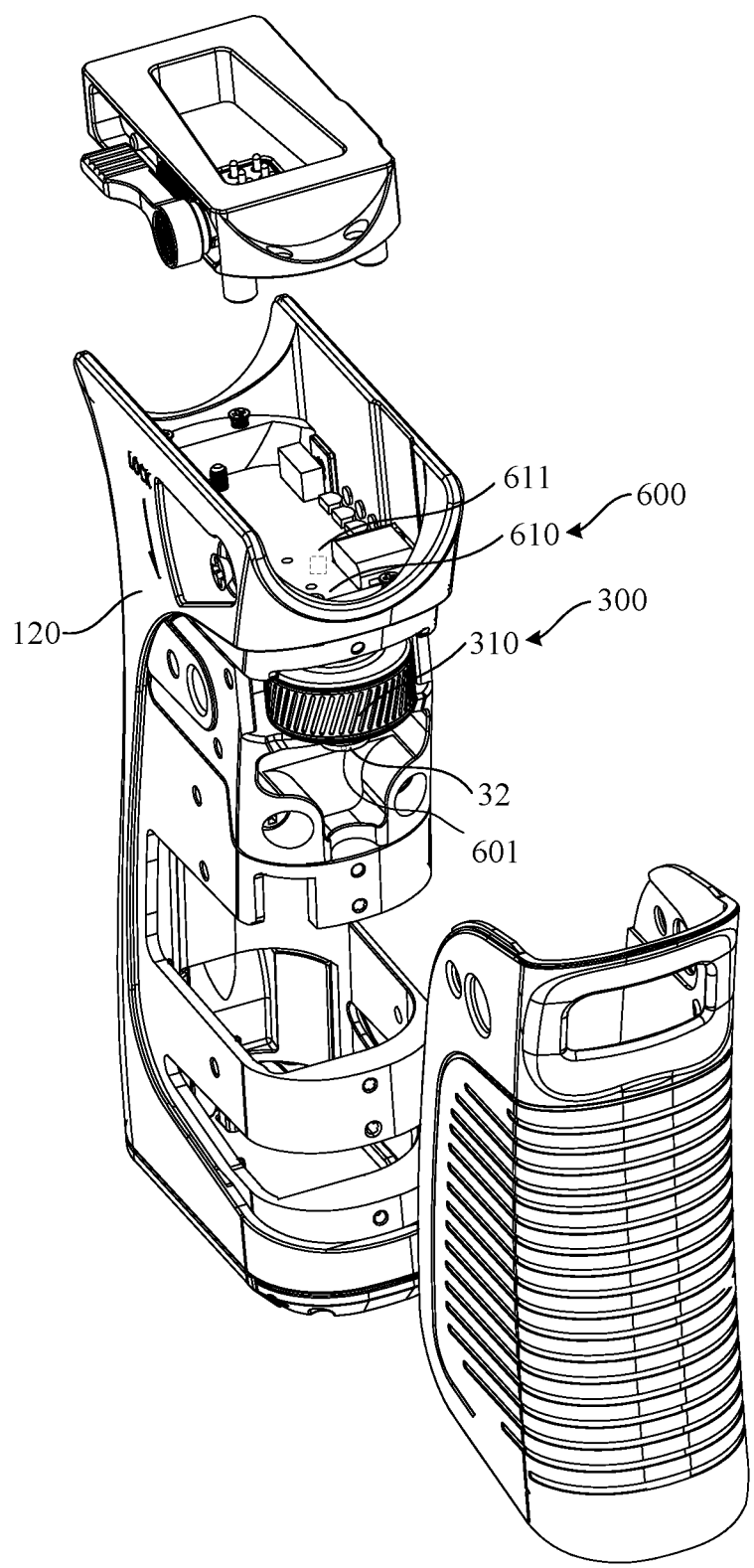
FIG. 9 is a second exploded diagram of the second body of the follow focus controller in FIG. 1.

In some embodiments, referring to FIG. 9, the second follow focus adjusting assembly 300 includes:
 an adjusting wheel 310, rotatably arranged on the second body 120. The rotation of the adjusting wheel 310 causes the second control circuit board 420 to generate the second follow focus control signal that includes rotation angle information of the adjusting wheel 310, and the follow focus motor rotates according to the second follow focus control signal for follow focus adjustment.

In the embodiments, the second follow focus adjusting assembly 300 includes the adjusting wheel 310. The follow focus can be realized by the rotation of the adjusting wheel 310. In particular, when the adjusting wheel 310 rotates, the second control circuit board 420 correspondingly generates the second follow focus control signal that includes the rotation angle information of the adjusting wheel 310, and then sends the second follow focus control signal to the follow focus motor via wireless or wired means, to control the follow focus motor. The adjusting wheel 310 may be mounted on the second body 120 by a mounting component (such as a mounting shaft, a bearing) and is rotatably arranged.

In some embodiments, referring to FIG. 9, the follow focus controller further includes:

a second detection assembly 600, arranged on the second body 120 and electrically connected to the second control circuit board 420, and configured to detect the rotation angle of the adjusting wheel 310.

In the embodiments, the second detection assembly 600 detects the rotation angle of the adjusting wheel 310, and sends the detected rotation angle data to the second control circuit board 420. The second control circuit board 420 generates the second follow focus control signal that includes the rotation angle information of the adjusting wheel 310 according to the rotation angle data. The second detection assembly 600 may be any angle sensor or encoder suitable for the present solution, which is not limited herein.

In some embodiments, referring to FIG. 9, a second rotation shaft 32 is arranged on the second body 120, and the adjusting wheel 310 is connected with the second rotation shaft 32. The second detection assembly 600 includes:

a second magnetic induction component, arranged on the second rotation shaft 32 or the adjusting wheel 310; and a second detection circuit board 610, arranged in the second body 120. The second detection circuit board 610 is provided with a second magnetic encoder chip 611, which is arranged facing the second magnetic induction component. The second magnetic encoder chip 611 calculates the rotation angle of the adjusting wheel 310 by sensing a change of the magnetic field between the second magnetic encoder chip 611 and the second magnetic induction component.

In the embodiments, the adjusting wheel 310 is connected to the second rotation shaft 32, and the second rotation shaft 32 rotates with the rotation of the adjusting wheel 310. The second detection assembly 600 directly detects the rotation angle of the adjusting wheel 310, or detects the rotation angle of the second rotation shaft 32 to obtain the rotation angle of the adjusting wheel 310. In some embodiments, the adjusting wheel 310 is directly or indirectly connected to the second rotation shaft 32, which is not limited herein. In case the adjusting wheel 310 is directly connected to the second rotation shaft 32, the adjusting wheel 310 is rotatably arranged on the second body 120 by the second rotation shaft 32, and directly drives the second rotation shaft 32 to rotate. In case the adjusting wheel 310 is indirectly connected to the second rotation shaft 32, the adjusting wheel 310 drives the second rotation shaft 32 to rotate by means of a transmission structure.

The second detection assembly 600 includes the second magnetic induction component and the second detection circuit board 610. With the second magnetic induction component arranged on the second rotation shaft 32 as an example, when the adjusting wheel 310 rotates to drive the second rotation shaft 32 to rotate, the second magnetic induction component rotates with the second rotation shaft 32, causing the magnetic field between the second magnetic induction component and the second magnetic encoder chip 611 on the second detection circuit board 610 to change. The second magnetic encoder chip 611 calculates the rotation angle of the second rotation shaft 32 based on the sensed change of the magnetic field, to obtain the rotation angle of the adjusting wheel 310. In particular, the second detection circuit board 610 of the second detection assembly 600 is electrically connected to the second control circuit board 420. In some embodiments, the second detection circuit board 610 is integrated in the second control circuit board 420. The second detection circuit board 610 is integrally designed with the second control circuit board 420, which makes the structure be compact, thereby reducing the space occupation.

In some embodiments, referring to FIG. 2, a camera interface 9 is arranged on the first body 110 and/or the second body 120. The camera interface 9 is configured to dock with a camera, a camera mount, or a camera frame.

In the embodiments, the first body 110 may be provided with the camera interface 9, so that the first body 110 can be docked with a camera, a camera mount, or a camera frame through the camera interface 9. The second body 120 may also be provided with the camera interface 9, so that the second body 120 can be docked with a camera, a camera mount, or a camera frame through the camera interface 9. The camera interface 9 may be one or more selected from a group consisting of a cold shoe interface, a threaded interface, an Alexa interface, an Akka interface, and a slide chute interface, which is not limited herein.

In some embodiments, referring to FIG. 9 to FIG. 12, the second body 120 includes a grip portion 120a for users to hold and a setting portion 120b. The setting portion is provided with a quick release interface 101. The conductive connector 4 is arranged in the quick release interface 101. The adjusting wheel 310 is adjacent to the grip portion 120a and rotatably arranged on the second body 120. The second control circuit board 420 is electrically connected to the conductive connector 4, and is configured to generate the second follow focus control signal to the second interface 3 according to the rotation angle of the adjusting wheel 310.

In the embodiments, users can use the follow focus controller by holding the grip portion 120a of the second body 120. The adjusting wheel 310 is ergonomically designed to locate on the rear side of the second body 120 and adjacent to the grip portion 120a. This makes it convenient for users to toggle the adjusting wheel 310 to implement follow focus adjustment, thereby improving the precision of the operation and enhancing the user experience.

In some embodiments, the grip portion 120a is ergonomically designed with finger grooves corresponding to human fingers, and the grip portion 120a is sleeved with an anti-slip silicone sleeve, thereby further realizing a good grip effect.

In some embodiments, the adjusting wheel 310 is arranged above the finger grooves, so it can be easily operated with a user's index finger.

In some embodiments, a part of the adjusting wheel 310 is received in the second body 120, and the other part of the adjusting wheel 310 is exposed outside the second body 120. The adjusting wheel 310 is provided with anti-slip ribs along its circumferential side to increase the friction between the user's fingers and the adjusting wheel 310.

In the embodiments, the second body 120 is provided with the grip portion 120a for users to hold, thus can be used as a handle. When a user holds the grip portion 120a, the second follow focus control signal can be generated by the follow focus adjusting wheel 310 and the second control circuit board 420 mounted on the second body 120, thereby expanding functional applications of the handle. In addition, the adjusting wheel 310 is arranged adjacent to the grip portion 120a, so it can be adjusted with the user's palm, thereby achieving one-hand control.

Figure 10:
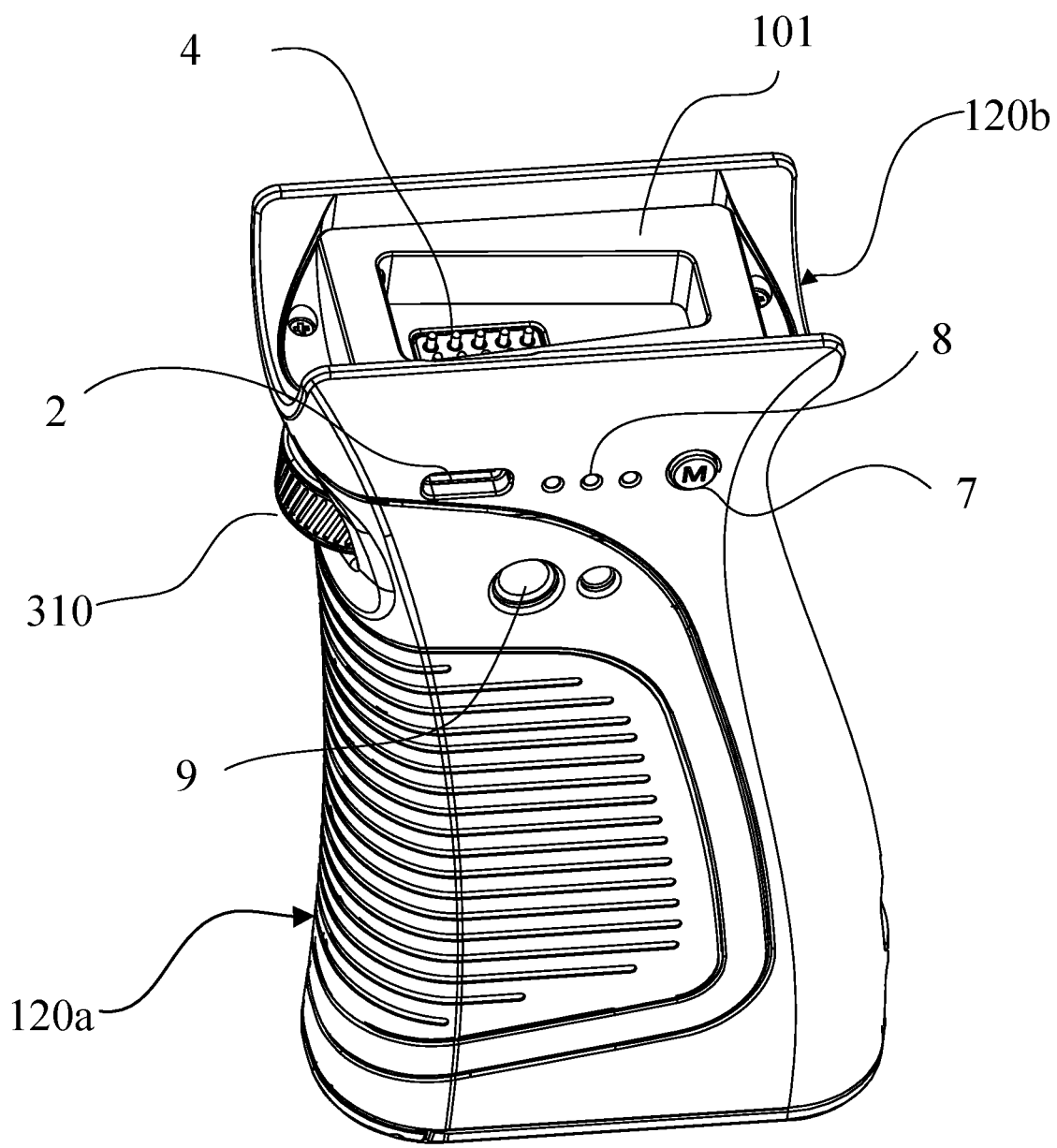
FIG. 10 is a schematic structural diagram of a second body according to an embodiment of the present disclosure.
Figure 11:
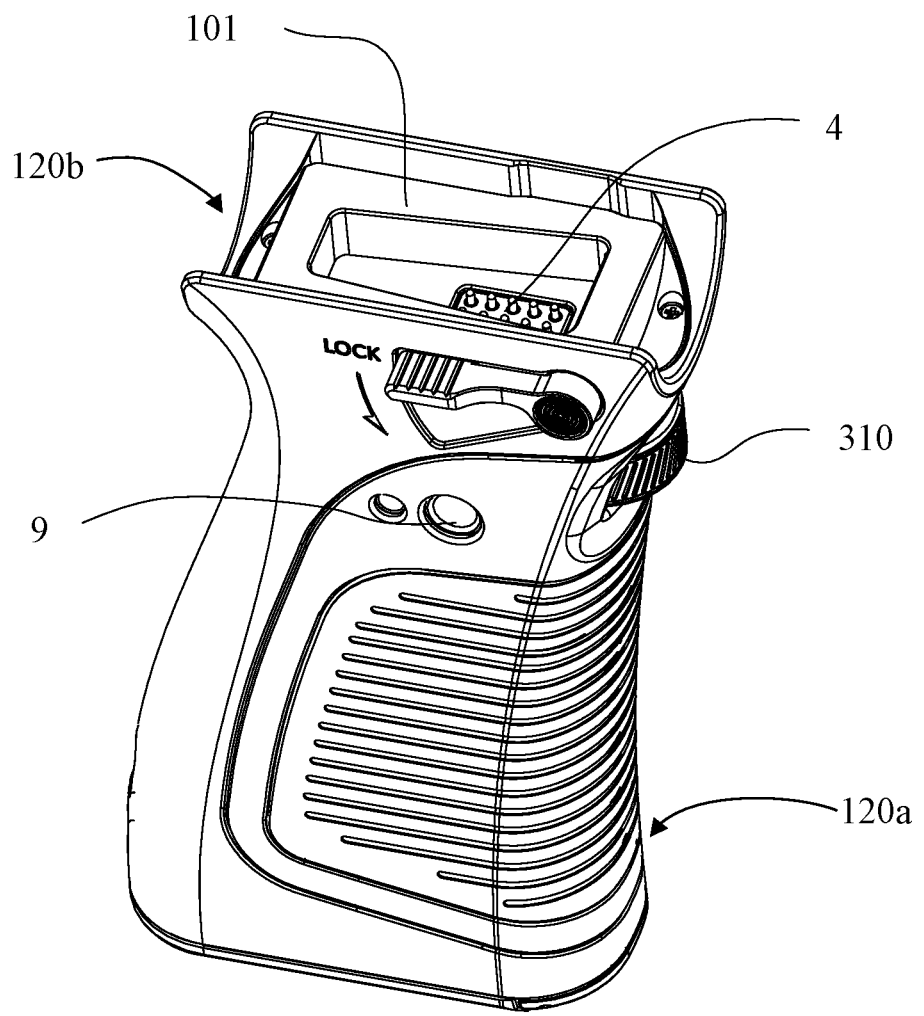
FIG. 11 is a schematic structural diagram of the second body in FIG. 10 from another view.

In some embodiments, referring to FIG. 10 and FIG. 11, the quick release interface 101 is recessed to form the connection slot 121. The conductive connector 4 is arranged at the bottom of the connection slot 121.

Figure 12:
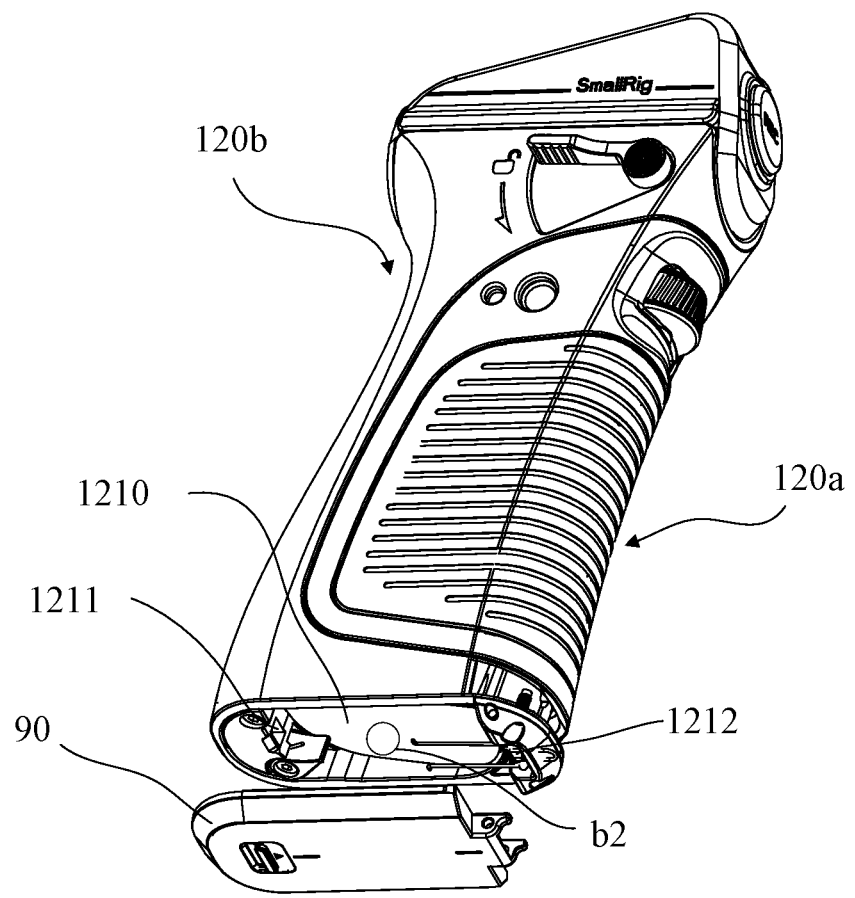
FIG. 12 is a schematic structural diagram of a battery compartment according to an embodiment in the present disclosure.
Figure 13:
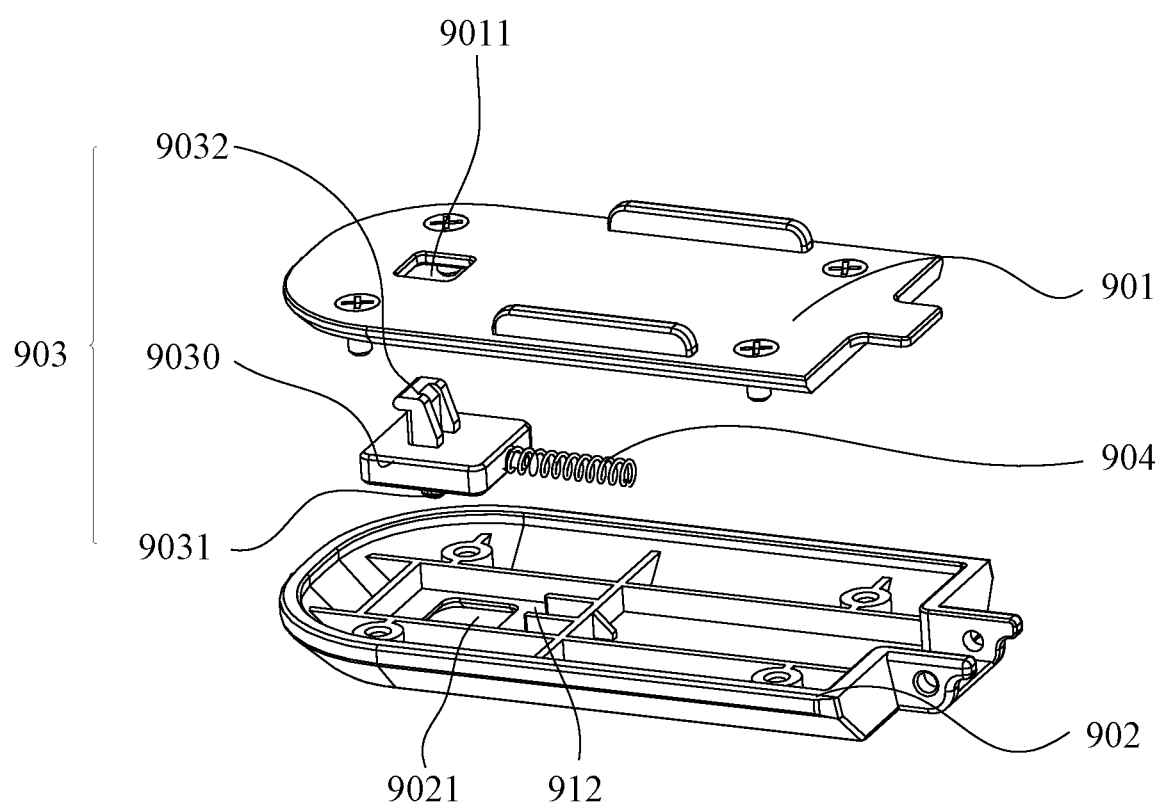
FIG. 13 is a schematic structural diagram of a cover of the battery compartment in FIG. 12.

In some embodiments, referring to FIG. 12 and FIG. 13, a second battery b2 is arranged in the second body 120. The second battery b2 is electrically connected to the second control circuit board 420.

Further, a battery compartment 1210 with an open end is defined in the grip portion 120a. A cover 90 for opening and closing the open end of the battery compartment 1210 is mounted on the grip portion 120a. The second battery b2 is detachably placed in the battery compartment 1210. In particular, the open end of the battery compartment 1210 is located at the bottom of the grip portion 120a. An end of the cover 90 is hinged with the grip portion 120a by a hinge component 1212, and the other end of the cover 90 is fastened with the grip portion 120a. A latching component 903 is slidably arranged at the other end of the cover 90, and the grip portion 120a is defined with a latching groove 1211 matched with the latching component 903. A second reset component 904 elastically abutting against the latching component 903 is arranged in the cover 90, to keep the latching component 903 in the latching groove 1211.

When the second battery b2 in the battery compartment 1210 needs to be replaced or repaired, the latching component 903 is separated from the latching groove 1211 by applying an external force to overcome the resistance of the second reset component 904, and then the hinged end of the cover 90 is rotated, such that the battery compartment 1210 is opened. Similarly, when closing the battery compartment 1210, the latching component 903 needs to be driven against the elastic force of the second reset component 904 to form an avoidance for assembly, and then the latching component 903 is released when the cover 90 is covered at the open end of the battery compartment 1210, such that the latching component 903 is assembled with the latching groove 1211 under the drive of the second reset component 904.

In some embodiments, to realize the motion of the latching component 903, the cover 90 includes a first cover body 901 and a second cover body 902. The first cover body 901 is fixed to a side of the second cover body 902 facing the battery compartment 1210, and a sliding groove 912 is defined between the first cover body 901 and the second cover body 902.

The latching component 903 includes a sliding portion 9030, an operating portion 9031, and a fastening portion 9032. The first cover body 901 is defined with a first through-opening 9011 communicating with the sliding groove 912, and the second cover body 902 is defined with a second through-opening 9021 communicating with the sliding groove 912. The sliding portion 9030 is slidably arranged in the sliding groove 912. The second reset component 904 is arranged in the sliding groove 912 and elastically abuts against the sliding portion 9030, to apply an elastic force to the sliding portion 9030 toward the latching groove 1211. The fastening portion 9032 is located in the first through-opening 9011, and the operating portion 9031 is located in the second through-opening 9021.

In the embodiments, the operating portion 9031 is arranged on one side of the sliding portion 9030, and the fastening portion 9032 is arranged on the opposite side of the sliding portion 9030. The operating portion 9031 is located at the second through-opening 9021, that is, the operating portion 9031 is arranged on the side facing users, to allow users to operate the latching component 903 through the operating portion 9031. The fastening portion 9032 is located at the first through-opening 9011, that is, the fastening portion 9032 is arranged on the side facing the inside of the grip portion 120a, to realize the connection between the latching component 903 and the grip portion 120a through the fastening portion 9032. When users move the operating portion 9031, the whole latching component 903 is driven to move, and the sliding portion 9030 moves along the sliding groove 912 against the elastic force of the second reset component 904, so that the fastening portion 9032 is separated from the latching groove 1211; when the force applied to the operating portion 9031 is released, the sliding portion 9030 is driven by the second reset component 904 to allow the entire latching component 903 to move along the sliding groove 912, and finally, the fastening portion 9032 is connected to the latching groove 1211, realizing the fastening of the cover 90.

In some embodiments, referring to FIG. 10, the second interface 2 is arranged on the setting portion 10. The second control circuit board 420 is further configured to communicate and interact with an external device plugged into the second interface 2, to select a working mode after obtaining a corresponding protocol.

In some embodiments, the second interface 2 includes one of a TYPE-C interface and a USB interface.

Further, the working mode includes a charging mode and a power supply mode.

In the charging mode, when an insertion action is detected, the second control circuit board 420 will communicate with an external device for information interaction. After obtaining the corresponding protocol, the current optimal voltage and current working mode is selected to provide a charging voltage, and the second battery b2 is configured to be in the charging mode. The external device inserted for power supply may be a power bank or a charging adapter connected to the electric supply.

The power supply mode is similar to the charging mode. When an insertion action is detected, the second control circuit board 420 will communicate with an external device for information interaction. After obtaining the corresponding protocol, the current optimal voltage and current working mode is selected for discharge.

In some embodiments, referring to FIG. 10, the second control button 7 and a plurality of indicator lights 8 are combined to form a power indication unit. The second control button 7 is configured to wake up the indicator lights 8. The indicator lights 8 are configured to indicate a current remaining power of the second battery b2.

In some embodiments, when the second interface 2 is plugged with an external device, the indicator lights 8 may also be actively woken up by the second control circuit board 420 in the charging mode.

In the embodiments, there are actually two wake-up ways, one of which is to actively wake up the indicator lights 8 based on the charging mode, and the other one of which is to wake up the indicator lights 8 by users pressing the second control button 7. The former is mainly used to detect the battery state in the charging mode to display a current level of the second battery b2 by the indicator lights 8, so that current charging process can be obtained in real time, thereby avoiding excessive occupation of charging resources; and the latter is mainly used in daily practice, to display the remaining power after the second battery b2 discharges, thereby preventing insufficient battery level from affecting the use of the follow focus controller. In particular, when the second control button 7 is pressed, the indicator lights 8 are woken up to indicate the current remaining power.

In some embodiments, a short press on the second control button 7 may wake up the indicator lights 8. A duration of the short press does not exceed 2 seconds. A long press on the second button 7 may change the indicator lights 8 from the on state to the off state. In some other embodiments, a preset display duration corresponding to the indicator lights 8 is set. The indicator lights 8 are automatically turned off if there is no operation within the preset display duration after a short press on the second control button 7. The preset display duration may be set to 3 seconds.

In some embodiments, the plurality of indicator lights 8 may display different colors respectively to map the current level of the second battery b2. In particular, the indicator lights 8 are red when the level of the second battery b2 is lower than 20%; one of the indicator lights 8 is green when the level of the second battery b2 is 20% to 60%; two of the indicator lights 8 are green when the level of the second battery b2 is higher than 60%; three of the indicator lights 8 are green when the second battery b2 is fully charged; and the indicator lights 8 are all off when the level of the first battery is 0.

In some embodiments, the second body 120 is defined with a lanyard hole 107, which is integrally formed with the second body 120. The lanyard hole 107 is configured to allow a lanyard to loop through.

In some embodiments, in case the first body 110 is assembled to the second body 120, the second control board 420 is further configured to control the second battery b2 in the second body 120 to power the first control circuit board 410 for the first sequential power supply, and to control the first battery b1 to power the first control circuit board 410 for the second sequential power supply. This improves the endurance of the first control circuit board 410.

Figure 14:
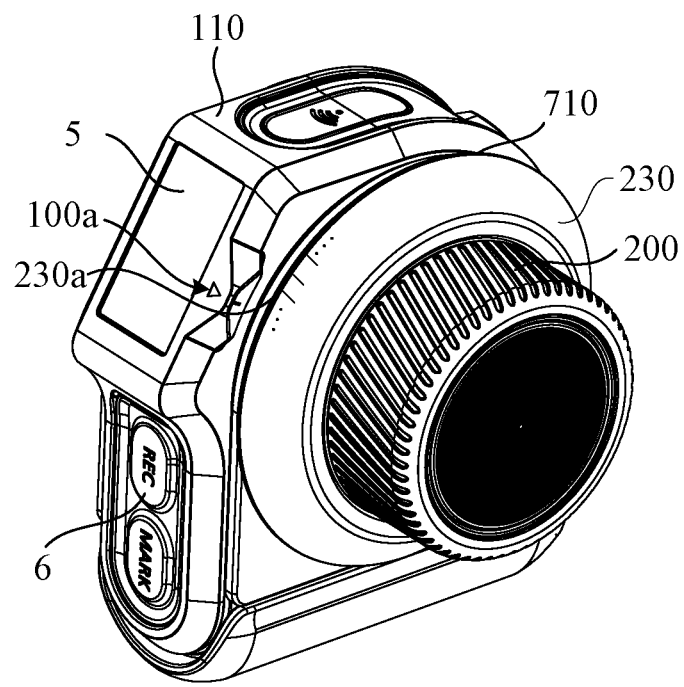
FIG. 14 is a schematic structural diagram of a first body according to an embodiment of the present disclosure.
Figure 15:
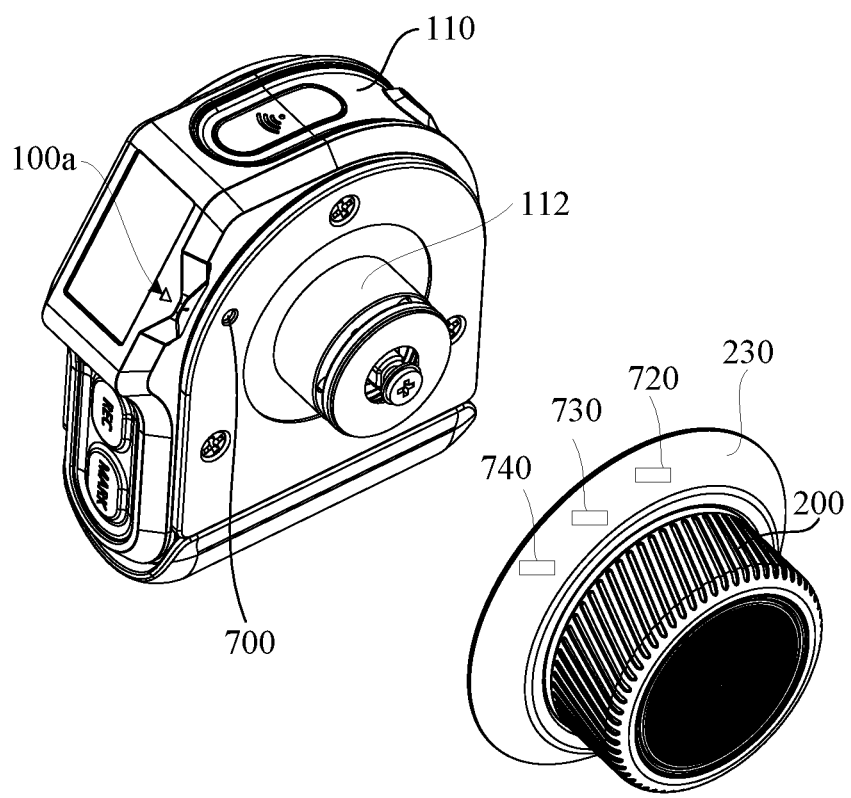
FIG. 15 is a first exploded diagram of the first body in FIG. 14.

In some embodiments, referring to FIG. 14 and FIG. 15, the first body 110 is provided with an indication sign 100*a*. Further, the follow focus controller includes:

a position ring 230, connected to the first follow focus adjusting assembly 200 to rotate with the first follow focus adjusting assembly 200, and configured for the indication sign 100*a* to indicate a rotation position of the first follow focus adjusting assembly 200; and an illumination structure, configured to illuminate the rotation position of the first follow focus adjusting assembly 200 indicated by the indication sign 100*a*.

The first body 110 is provided with the indication sign 100*a*, which may be a triangular pattern as shown in FIG. 1, an indication line, or the like. In addition, the indication sign 100*a* may be provided at any position of the first body 110 as long as it is adjacent to the position ring 230. The presentation of the indication sign 100*a* and the location of the indication sign 100*a* on the first body 110 are not limited herein, which are set according to an actual situation.

The position ring 230 is arranged on the first follow focus adjusting assembly 200 and can rotate with the first follow focus adjusting assembly 200. The position ring 230 may be a circular ring or a hollowed-out ring. In addition, the position ring 230 may be an independent component integrally formed, or may be an assembly of a plurality of components, which is not limited herein. When the position ring 230 is arranged on the first follow focus adjusting assembly 200, the center line of the position ring 230 is the same as the rotation axis 10 of the first follow focus adjusting assembly 200. The position ring 230 is configured for the indication sign 100*a* to indicate the rotation position of the first follow focus adjusting assembly 200. Illustratively, the position ring 230 may be provided with a plurality of position markers 230*a*. The indication sign 100*a* is arranged at a fixed position on the first body 110, and the position marker 230*a* is configured for the indication sign 100*a* to be aligned with. When the first follow focus adjusting assembly 200 rotates to different angular positions, the indication sign 100*a* is correspondingly aligned with different position markers 230*a* on the position ring 230. In some embodiments, the position marker 230*a* may be a standard angle mark. During in use, the first follow focus adjusting assembly 200 is rotated to control the rotation of the lens, and the position ring 230 rotates synchronously.

The position marker 230*a* on the position ring 230 aligned with the indication sign 100*a* represents the current rotation angular position of the first follow focus adjusting assembly 200, namely the current follow focus adjustment position. The position marker 230*a* on the position ring 230 may be manually drawn by users and is erasable, or may be pre-printed, which is set according to an actual situation. In some embodiments, the position ring 230 is detachably arranged on the first follow focus adjusting assembly 200, so that users can replace different position rings 300 according to an actual situation.

Further, the illumination structure is configured to illuminate the rotation position of the first follow focus adjusting assembly 200 indicated by the indication sign 100*a*. The illumination structure may be provided in various forms. Illustratively, the illumination structure includes an illumination light, which is arranged on the first body 110. When the illumination light is turned on, the light may be directed towards the position indicated by the indication sign 100*a* to enhance the brightness. Other forms in which the illumination structure may be provided will be described in detail in subsequent embodiments.

The follow focus controller performs follow focus adjustment by rotating the first follow focus adjusting assembly 200. The position ring 230 connected to the first follow focus adjusting assembly 200 rotates with it, and the position of the position ring 230 aligned with the indication sign 100*a* on the first body 110 is the current follow focus adjustment position. When the follow focus controller is used at night or in an environment with low brightness, the illumination structure illuminates the rotation position of the first follow focus adjusting assembly 200 indicated by the indication sign 100*a*, so that users can clearly see the position where the indication sign 100*a* is aligned with the position ring 230, to clearly know the follow focus adjustment position. This improves the user experience.

In some embodiments, the position ring 230 is provided with a position marker 230*a* for the indication sign 100*a* to be aligned with. The illuminating structure includes an illuminating component 700, which is arranged on the first body 110 and configured to illuminate the position marker 230*a* aligned with the indication sign 100*a*.

In the embodiments, the position marker 230*a* may be a standard angle mark, such as in the form of an angle scale. During the rotation of the first follow focus adjusting assembly 200, the position ring 230 rotates synchronously with it. The position marker 230*a* on the position ring 230 aligned with the indication sign 100*a* represents the current rotation angular position of the first follow focus adjusting assembly 200, namely the current follow focus adjustment position. The illumination component 700 can be turned on to illuminate the position marker 230*a* aligned with the indication sign 100*a* at night or in a low brightness environment, making the position marker 230*a* visible. The illumination component 700 is not limited in its arrangement, as long as the illumination component 700 can meet the requirement of illuminating the position marker 230*a* aligned with the indication sign 100*a*.

In some embodiments, the illumination component 700 is located on a side of the first body 110 facing the position ring 230. The position ring 230 is provided with a light-transmitting area. The light-transmitting area covers the illumination component 700, and the position marker 230*a* is located in the light-transmitting area.

In the embodiments, the light emitted by the illumination component 700 can pass through the light-transmitting area of the position ring 230, to allow the position marker 230*a* in the light-transmitting area to be clearly displayed. The light-transmitting area on the position ring 230 may be a partial region or an entire region of the position ring 230, which is set according to an actual situation. In some embodiments, the light-transmitting area of the position ring 230 is made of a light-transmitting material, and the present embodiment does not limit what kind of light-transmitting material is used.

In some embodiments, the illumination component 700 includes a display light located on an indication path of the indication sign 100a.

In the embodiments, the illumination component 700 uses the display light arranged on the indication path of the indication sign 100a, so that the position marker 230a aligned with the indication sign 100a is illuminated by the display light. In some embodiments, the display light is embedded in an outer surface of the first body 110 to avoid the mounting position of the position ring 230, so that the position ring 230 can be arranged closer to the first body 100, thereby making the structure compact.

In some embodiments, the illumination structure includes a light-emitting strip 710. The light-emitting strip 710 is arranged on the position ring 230 along the circumferential direction of the position ring 230, or is integrally formed with the position ring 230.

The light-emitting strip 710 is divided into a plurality of display areas along its length direction. The plurality of display areas have different display colors or display brightness levels. The indication sign 100a is aligned with one of the display areas of the light-emitting strip 710 to indicate the rotation position of the first follow focus adjusting assembly 200.

In the embodiments, the plurality of display areas of the light-emitting strip 710 correspond to a plurality of rotation positions of the first follow focus adjusting assembly 200, that is, a one-to-one correspondence relationship is established. During the rotation of the first follow focus adjusting assembly 200, the display area of the light-emitting strip 710 aligned with the indication sign 100a corresponds to a current rotation position of the first follow focus adjusting assembly 200. Since the display colors or the display brightness levels of different display areas of the light-emitting strip 710 are different, the rotation position of the first follow focus adjusting assembly 200 can be obtained according to the display color or the display brightness level of the display area of the light-emitting strip 710 aligned with the indication sign 100a. For example, the display colors of the plurality of light-emitting areas of the light-emitting strip 710 include red, orange, yellow, green, cyan, blue, purple, and the like; or the display brightness levels of the plurality of light-emitting areas of the light-emitting strip 710 ranges from high to low.

In some embodiments, the illumination structure further includes a light control circuit board 720 and a wireless assembly 730 and/or a light control button 740 electrically connected to the light control circuit board 720. The light control circuit 720 board is electrically connected to the light-emitting strip 710.

The light control circuit board 720 is configured to send a light control signal to the light-emitting strip 710, to adjust the display color or the display brightness level of the light-emitting strip 710.

In the embodiments, users can adjust the illumination by wireless control of mobile terminal or manual operation of a button. In particular, the light control circuit board 720 receives the light control signal sent from the wireless assembly 730 or the light control button 740 and sends it to the light-emitting strip 710, and the light-emitting strip 710 changes its display color or display brightness level based on the light control signal. In some embodiments, the light control circuit board 720 and the wireless assembly 730 and/or the light control button 740 are arranged on the position ring 230. In some embodiments, the position ring 230 is further provided with a battery electrically connected to the light control circuit board 720 to power to the light-emitting strip 710.

In the embodiments, the first control circuit board 410 is arranged in the first body 110 and connected to the first body 110 by a fastener such as a screw. The first control circuit board 410 has the functions of sending and receiving signals, data processing, and the like. For example, the first control circuit board 410 generates the first focus control signal and sends it to the follow focus motor when the first follow focus adjusting assembly 200 rotates. Other electronic components of the follow focus controller arranged on the first body 110 may be electrically connected to the first control circuit board 410.

In some embodiments, the illumination component 700 is electrically connected to the first control circuit board 410. The first control circuit board 410 is further configured to send an illumination control signal to the illumination component 700, to allow the illumination component 700 to adjust a display mode according to the illumination control signal.

In the embodiments, the display mode of the illumination component 700 may include switching, adjusting the display color, or adjusting the display brightness level. That is, the illumination component 700, after receiving the illumination control signal from the first control circuit board 410, adjusts its switching, adjusts the display color, or adjusts the display brightness level according to the illumination control signal.

In addition to illumination, the illumination component 700 may further be configured for indication. For example, when the battery level is insufficient, the illumination component 700 glows and flashes to alert.

Figure 16:
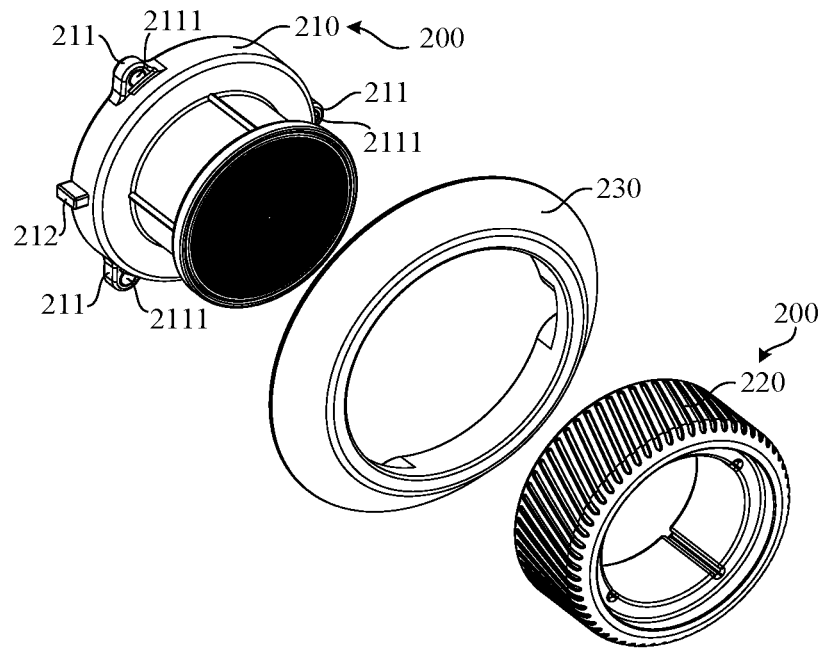
FIG. 16 is a first exploded diagram of a part of the first body in FIG. 14.
Figure 17:
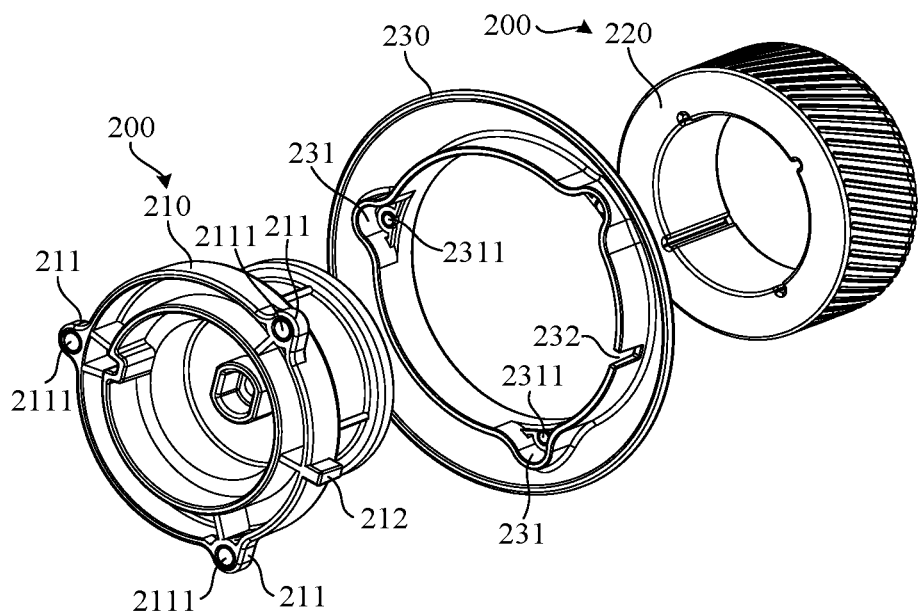
FIG. 17 is a second exploded diagram of the part of the first body in FIG. 14.

In some embodiments, referring to FIG. 16 and FIG. 17, the position ring 230 is sleeved on the adjustment knob 210. In some embodiments, the position ring 230 is located on a side of the adjustment knob 210 close to the first body 110. The position ring 230 is adjacent to the first body 110 to facilitate the alignment of the indication sign 100a on the first body 100 for indication. The position ring 230 is detachably arranged on the adjustment knob 210. The position ring 230 and the adjustment knob 210 may be connected by way of snap-fit connection, magnetic attraction connection, or the like, which is set according to an actual situation.

In some embodiments, referring FIG. 16 and FIG. 17, an outer circumferential wall of the adjustment knob 210 is protruded to provide a plurality of latching portions 211. The plurality of latching portions 211 are arranged at intervals along a circumferential direction of the adjustment knob 210. The position ring 230 is defined with a plurality of latching slots 231. Each latching portion 211 is correspondingly inserted into one of the latching slots 231.

In the embodiments, the plurality of latching portions 211 on the adjustment knob 210 and the plurality of latching slots 231 in the position ring 230 are the same in number and correspond in position. When the position ring 230 is sleeved on the adjustment knob 210, each latching portion 211 is correspondingly inserted into one of the latching slots 231. In some embodiments, the latching portion 211 is matched with the latching slot 231. When the latching portion 211 is inserted into the latching slot 231, it is expanded to be tightly fastened in the latching slot 231, to realize the connection of the position ring 230 and the adjustment knob 210. Certainly, the foregoing arrangement is merely exemplary and is not intended to limit the protection scope of present disclosure. In some embodiments, three latching portions 211 are provided. The three latching portions 211 are arranged at intervals along the circumferential direction of the adjustment knob 210, and the distance between any two adjacent latching portions 211 are equal. Correspondingly, three latching slots 231 are defined in the position ring 230.

In some embodiments, referring to FIG. 16 and FIG. 17, the latching portion 211 is provided with a first magnetic component 2111, and the latching slot 2311 is provided with a second magnetic component 2311. The first magnetic component 2111 is magnetically attracted with the second magnetic component 2311.

In the embodiments, when the position ring 230 is sleeved on the adjustment knob 210 and the latching portions 211 are correspondingly inserted into the latching slots 231, the first magnetic components 2111 on the latching portions 211 magnetically attract with the second magnetic components 2311 on the latching slots 231. In this way, the position ring 230 is fixed on the adjustment knob 210 by magnetic attraction, which makes the matching stable and the disassembly convenient. In some embodiments, the latching portion 211 is defined with first mounting grooves, and the first magnetic components 2111 are mounted in the first mounting grooves; bottom wall of the latching slots 231 are recessed to define second mounting grooves, and the second magnetic components 2311 are mounted in the second mounting grooves. In some embodiments, either one of the first magnetic component 2111 and the second magnetic component 2311 is a magnet, and the other one is a magnetic metal component, such as an iron sheet.

In some embodiments, referring to FIG. 16 and FIG. 17, the outer circumferential wall of the adjustment knob 210 is further provided with a positioning protrusion 212, and the position ring 230 is further defined with a positioning notch 232. The positioning protrusion 212 is inserted in the positioning notch 232.

In the embodiments, when the position ring 230 is sleeved on the adjustment knob 210, the positioning protrusion 212 is inserted into and matched with the positioning notch 302. In particular, when users mount the position ring 230, the mounting position of the position ring 230 can be quickly found by inserting the positioning notch 302 of the position ring 230 into the positioning protrusion 212 of the adjustment knob 210 for alignment, thereby realizing fast and accurate mounting of the position ring 230. In some embodiments, one positioning protrusion 212 is provided and located between two adjacent latching portions 211 on the adjustment knob 210. Correspondingly, one positioning notch 232 in the position ring 230 is provided.

Figure 18:
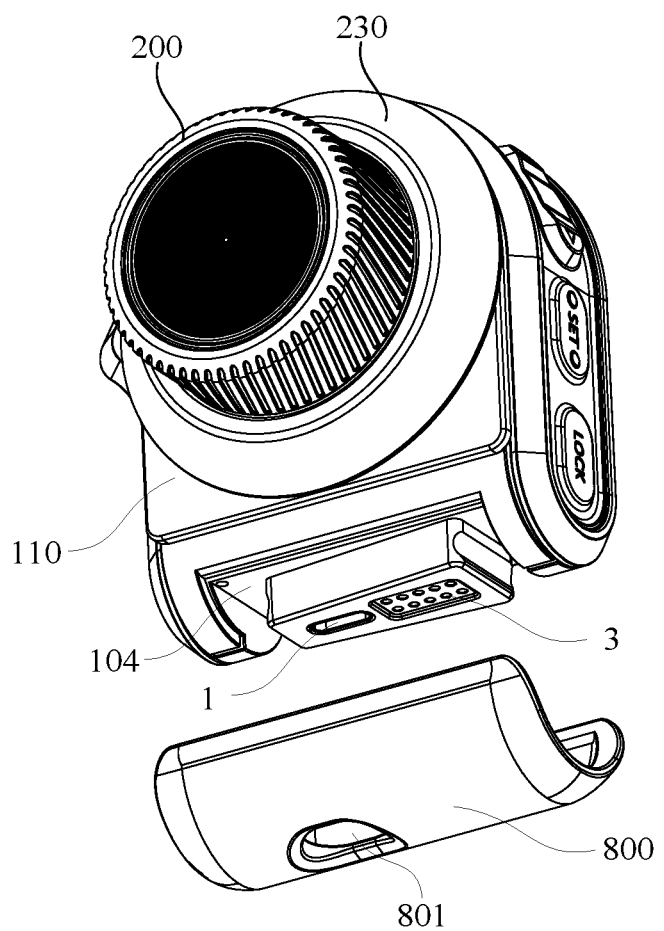
FIG. 18 is a second exploded diagram of the first body in FIG. 14.

In some embodiments, referring to FIG. 18, a recessed cavity 104 is defined in the bottom of the first body 110. The first interface 1 and the conductive interface 3 are located in the recessed cavity 104 and adjacent to each other.

The follow focus controller further includes a bottom cover 800. The bottom cover 800 covers the recessed cavity 104 and is detachably connected to the first body 110. The bottom cover 800 is defined with an avoidance hole 801 for exposing the first interface 1 or the conductive interface 3.

In the embodiments, the follow focus controller is provided with both the first interface 1 and the conductive interface 3. The first interface 1 and the conductive interface 3 are both located in the recessed cavity 104 defined in the bottom of the first body 110 and adjacent to each other. The recessed cavity 104 is covered by the bottom cover 800 detachably connected to the first body 110. The first interface 1 or the conductive interface 3 is exposed through the avoidance hole 801 defined in the bottom cover 800. In some scenarios, when the first body 110 is used alone, the bottom cover 800 may be assembled on the first body 110, and the first interface 1 is exposed through the avoidance hole 801 of the bottom cover 800, to allow a cable to be inserted into the first interface 1 for charging, and the conductive interface 3 is covered by the bottom cover 800 for protection. When the first body 110 is used with another device (such as the second body 120 with the adjusting wheel and the second control circuit board arranged thereon), the bottom cover 800 can be detached from the first body 110, to facilitate the assembly of the first body 110 with the another device; also, the conductive interface 3 is directly connected to a conductive connector on the another device to realize communication therebetween.

Figure 20:
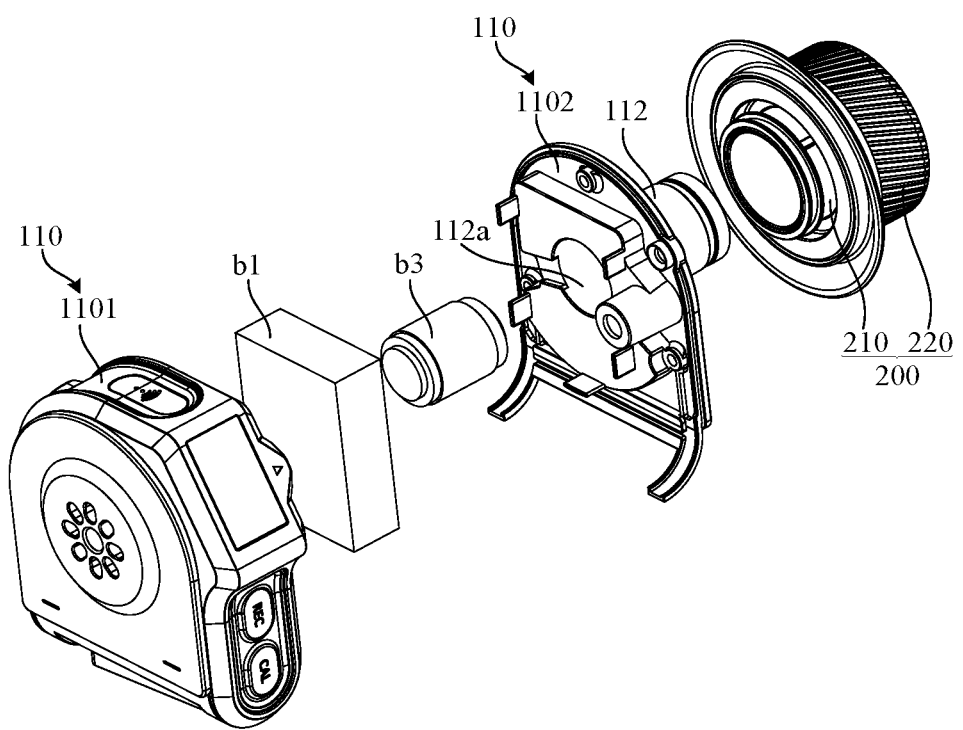
FIG. 20 is an exploded diagram of the first body in FIG. 19 from another view.

In some embodiments, referring to FIG. 20 and FIG. 21, in addition to the first battery b1, a third battery b3 is further arranged in the first body 110 of the follow focus controller. The third battery b3 is electrically connected to the first control circuit board 410 to power the first control circuit board 410.

The first battery 10 and the third battery b3 are arranged in the first body 110, and are electrically connected to the first control circuit board 410, to power the first control circuit board 410, and further power other electronic components electrically connected to the first control circuit board 410 through the first control circuit board 410. In some embodiments, the first battery b1 is the main battery and the third battery b3 is the secondary battery. During the working of the follow focus controller, the first battery b1 will take the priority to supply power, and the third battery b3 will be switched to supply power when the first battery b1 has run out of power. The types, capacities, shapes, sizes, and the like of the first battery b1 and the third battery b3 are not limited herein, which are set according to an actual situation. In addition, the first battery b1 and the third battery b3 may have the same or different types, capacities, shapes, or sizes. In some embodiments, the first battery b1 is a 1200 milliampere-hour (mAh) lithium rechargeable battery, and the third battery b3 is a 300 mAh rechargeable capacitor.

The present follow focus controller supplies power to the first control circuit board 410 by the first battery b1 and the third battery b3, which ensures the normal operation of the first control circuit board 410 and the electronic components connected thereto. The dual-battery design employed by the follow focus controller makes the power last longer, which greatly prolongs the use duration, thereby improving the user experience.

With further function optimization and upgrade of the follow focus controller, in some other embodiments, on the basis of providing the first battery b1 and the third battery b3, the follow focus controller may be further provided with a fourth battery or even a fifth battery, to further increase the storage capacity and thereby prolonging the use duration. That is, those skilled in the art can appropriately increase the number of batteries in the follow focus controller according to the basic solution of the present disclosure according to actual requirements.

In some embodiments, the third battery b3 is mounted in the mounting cavity 112a.

In the embodiments, the cavity space of the mounting cavity 112a is matched to the outer contour of the third battery b3, to allow the third battery b3 to be mounted in the mounting cavity 112a of the mounting portion 112. By defining the mounting cavity 112a in the protruded mounting portion 112 on the first body 100 to mount the third battery b3, the internal space of the first body 110 is saved, thereby making the structure more compact.

Figure 19:
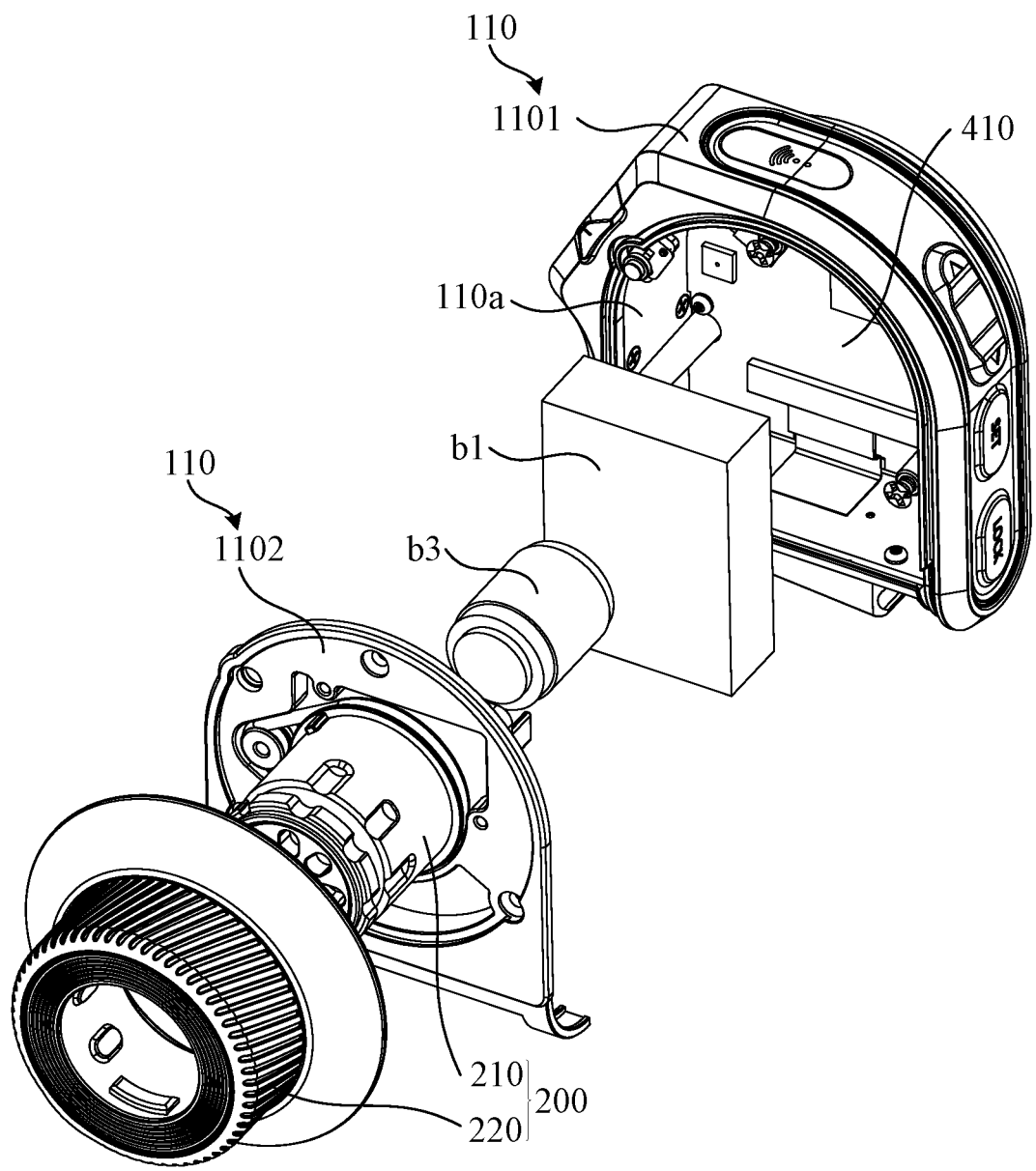
FIG. 19 is an exploded diagram of a first body according to an embodiment of the present disclosure.

In some embodiments, referring to FIG. 19 and FIG. 20, the first body 110 includes a first housing 1101 and a second housing 1102.

The first housing 1101 is defined with an accommodation cavity 110a and an opening communicating with the accommodation cavity 110a. The opening is located on a side of the first housing 1101. The first control circuit board 410 and the first battery b1 are located in the accommodation cavity 110a.

The second housing 1102 is detachably connected to the first housing 1101 and covers the opening. The mounting portion 112 is provided on the second housing 1102. The mounting cavity 112a is communicated with the accommodation cavity 110a.

In the embodiments, the first body 110 includes the first housing 1101 and the second housing 1102 that are detachably connected to each other. There is no restriction on the type of connection of the first housing 1101 and the second housing 1102, which can be a screw connection or a snap-fit connection, or the like. The first housing 1101 is defined with the accommodation cavity 110a for receiving electronic components such as the first control circuit board 410 and the first battery b1. After the second housing 1102 is detached from the first housing 1101, the opening of the accommodation cavity 110a is opened, so that the electronic components such as the first control circuit board 410 and the first battery b1 can be removed or installed through the opening. After the second housing 1102 is assembled to the first housing 1101, the opening of the accommodation cavity 110a is covered by the second housing 1102. Further, the mounting portion 112 is provided on the second housing 1102. The mounting portion 112 is located on a side surface of the second housing 1102, and a cavity opening of the mounting cavity 112a is defined in the other side surface of the second housing 1102, so that the third battery b3 can be placed into or taken out of the mounting cavity 112a through the cavity opening of the mounting cavity 112a. When the second housing 1102 is assembled to the first housing 1101, the mounting cavity 112a is communicated with the accommodation cavity 110a through the cavity opening. The mounting cavity 112a of the second housing 1102 is communicated with the accommodation cavity 110a of the first housing 1101, which facilitates wiring between the third battery b3 and the first control circuit board 410.

In some embodiments, at least one of the first battery b1 and the third battery b3 is a fast charging capacitor. In the embodiments, the first battery b1 or the third battery b3 is a fast charging capacitor, or both the first battery b1 and the third battery b3 are fast charging capacitors, which is set according to an actual situation. The fast charging capacitor makes the follow focus controller charge faster, which saves charging time, thereby further improving the user experience.

The present disclosure further provides a follow focus system, including follow focus motors and the foregoing follow focus controller. The follow focus controller is communicated with the follow focus motors to control the follow focus motors.

The specific structure of the follow focus controller may refer to the foregoing embodiments. The follow focus system adopts all the technical solutions of the foregoing embodiments, so it at least has all the technical effects brought by the technical solutions of the foregoing embodiments, which is not detailed herein.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A follow focus controller, comprising:
a body;
a first follow focus adjusting assembly and a second follow focus adjusting assembly, arranged on the body; and
a control assembly, arranged on the body and configured to generate a first follow focus control signal according to a rotation of the first follow focus adjusting assembly or to generate a second follow focus control signal according to a rotation of the second follow focus adjusting assembly, the first follow focus control signal and the second follow focus control signal being configured to control different follow focus motors to work;
wherein the body comprises:
a first body, the first follow focus adjusting assembly being arranged on the first body; and
a second body, the second follow focus adjusting assembly being arranged on the second body;
wherein the first body is detachably assembled to the second body; and
the control assembly comprises:
a first control circuit board, arranged on the first body and configured to generate the first follow focus control signal according to the rotation of the first follow focus adjusting assembly; and
a second control circuit board, arranged on the second body and configured to generate the second follow focus control signal according to the rotation of the second follow focus adjusting assembly;
wherein the first control circuit board is electrically connected to the second control circuit board in case the first body is assembled to the second body.

2. The follow focus controller according to claim 1, wherein,
the first body or the second body is provided with a wireless module, and the wireless module is electrically connected to the first control circuit board and/or the second control circuit board; and/or, the first body is provided with a first interface connected to the first control circuit board; and/or, the second body is provided with a second interface electrically connected to the second control circuit board; and/or
the first body is provided with a conductive interface electrically connected to the first control circuit board, the second body is provided with a conductive connector electrically connected to the second control circuit board, and the conductive connector is inserted into the conductive interface in case the first body is assembled to the second body, to allow the first control circuit board to be electrically connected with the second control circuit board.

3. The follow focus controller according to claim 1, wherein,
the first body is provided with a connection portion;

the second body is defined with a connection slot matched to the connection portion; and the connection portion is inserted into and fastened in the connection slot, to allow the first control circuit board to be electrically connected with the second control circuit board.

4. The follow focus controller according to claim 3, wherein, a side wall of the connection portion is defined with a notch, and a side wall of the connection slot is defined with an opening;

a locking component is arranged on the second body, and the locking component passes through the opening and extends into the notch to lock the connection portion or retreat from the notch to release the connection portion.

5. The follow focus controller according to claim 4, wherein the locking component comprises:

a rotation portion, rotatably arranged on the second body; and a clamping portion, connected with the rotation portion to rotate with the rotation portion, to extend into or retreat from the notch;

a first reset component is arranged on the second body, and an end of the first reset component is connected to the rotation portion to reset the rotation portion.

6. The follow focus controller according to claim 5, wherein the locking component further comprises:

a pulling portion, arranged on the second body;

wherein an end of the rotation portion passes through an outer side wall of the second body and is connected with the pulling portion.

7. The follow focus controller according to claim 1, wherein the first follow focus adjusting assembly comprises:

an adjustment knob, rotatably arranged on a side of the first body;

wherein the adjustment knob rotates to cause the first control circuit board to generate the first follow focus control signal that comprises rotation angle information of the adjustment knob.

8. The follow focus controller according to claim 7, further comprising:

a first detection assembly, arranged on the first body and electrically connected to the first control circuit board, and configured to detect a rotation angle of the adjustment knob.

9. The follow focus controller according to claim 8, wherein a first rotation shaft is arranged on the first body, the adjustment knob is connected with the first rotation shaft, and the first detection assembly comprises:

a first magnetic induction component, arranged on the first rotation shaft; and a first detection circuit board, located in the first body, the first detection circuit board being provided with a first magnetic encoder chip arranged facing the first magnetic induction component, and the first magnetic encoder chip calculating the rotation angle of the adjustment knob by sensing a change of a magnetic field between the first magnetic encoder chip and the first magnetic induction component.

10. The follow focus controller according to claim 9, wherein a side of the first body is protruded outward to form a mounting portion, an end of the first rotation shaft is located in the mounting portion, and the other end of the first rotation shaft protrudes from the mounting portion;

the adjustment knob is sleeved on the mounting portion and connected to the other end of the first rotation shaft.

11. The follow focus controller according to claim 10, wherein, a mounting cavity is defined in the mounting portion, and the first rotation shaft is mounted in the mounting cavity by a bearing; and a damping ring is arranged in the mounting cavity, and the damping ring is sleeved on the end of the first rotation shaft located in the mounting cavity.

12. The follow focus controller according to claim 10, wherein, a first friction sheet is mounted at an end of the mounting portion facing the adjustment knob;

a second friction sheet overlapping the first friction sheet is arranged in the adjustment knob; and the mounting portion, the first friction sheet, the second friction sheet, and the adjustment knob abut against one another.

13. The follow focus controller according to claim 12, wherein, an end of the mounting portion facing the adjustment knob is defined with a plurality of mounting holes, the first friction sheet is provided with a plurality of mounting posts, and each mounting post is inserted into one of the mounting holes;

each mounting hole is provided with an elastic component, an end of the elastic component abuts against a bottom wall of the mounting hole, and the other end of the elastic component abuts against the mounting post; and the elastic component applies an elastic force to the mounting post, to allow the first friction sheet to abut against the second friction sheet, and the second friction sheet to abut against the adjustment knob.

14. The follow focus controller according to claim 10, wherein, a side of the first body is recessed inward to define an accommodation slot, and the accommodation slot is arranged around the mounting portion; a cover plate is arranged at the accommodation slot, the cover plate covers the accommodation slot and is detachably connected to the first body; an end of the first rotation shaft is provided with a first transmission wheel and is located in the accommodation slot, and the other end of the first rotation shaft penetrates into the first body; an end of the adjustment knob is provided with a second transmission wheel and extends into the accommodation slot; the first transmission wheel and the second transmission wheel are connected by a transmission component; or an elastic ring is mounted on an outer wall surface of the mounting portion, and the elastic ring abuts against an inner wall surface of the adjustment knob to support the adjustment knob to rotate.

15. The follow focus controller according to claim 7, wherein the first follow focus adjusting assembly further comprises:

a knob sleeve, sleeved on the adjustment knob and fixed to the adjustment knob.

16. The follow focus controller according to claim 15, wherein, an outer wall surface of the adjustment knob is defined with a first engaging groove arranged along an axial direction of the adjustment knob and a second engaging groove arranged along a radial direction of the adjustment knob, and an inner wall surface of the knob sleeve is provided with a first engaging portion in engagement with the first engaging groove and a second engaging portion in engagement with the second engaging groove.

17. The follow focus controller according to claim 1, wherein the second follow focus adjusting assembly comprises:
an adjusting wheel, rotatably arranged on the second body;
wherein the adjusting wheel rotates to cause the second control circuit board to generate the second follow focus control signal that comprises rotation angle information of the adjusting wheel.

18. The follow focus controller according to claim 17, further comprising:
a second detection assembly, arranged on the second body and electrically connected to the second control circuit board, and configured to detect a rotation angle of the adjusting wheel.

19. The follow focus controller according to claim 18, wherein a second rotation shaft is arranged on the second body, the adjusting wheel is connected with the second rotation shaft, and the second detection assembly comprises:
a second magnetic induction component, arranged on the second rotation shaft or the adjusting wheel; and
a second detection circuit board located in the second body, the second detection circuit board being provided with a second magnetic encoder chip arranged facing the second magnetic induction component, and the second magnetic encoder chip calculating the rotation angle of the adjusting wheel by sensing a change of a magnetic field between the second magnetic encoder chip and the second magnetic induction component.

20. The follow focus controller according to claim 1, wherein the second body comprises:
a grip portion for a user to hold; and
a setting portion, provided with a quick release interface; a conductive connector being arranged in the quick release interface; and
the second follow focus adjusting assembly comprises:
an adjusting wheel adjacent to the grip portion and rotatably arranged on the second body;
wherein the second control circuit board is electrically connected to the conductive connector, and is configured to generate the second follow focus control signal to the conductive connector according to a rotation angle of the adjusting wheel.

21. The follow focus controller according to claim 20, wherein a first battery is placed in the first body, and the first battery is electrically connected to the first control circuit board; and/or
a second battery is placed in the second body, and the second battery is electrically connected to the second control circuit board.

22. The follow focus controller according to claim 21, wherein a battery compartment with an open end is defined in the grip portion, and the second battery is placed in the battery compartment; and
a cover for opening and closing the open end of the battery compartment is mounted on the grip portion, an end of the cover is hinged with the grip portion, and the other end of the cover is latched with the grip portion;
wherein a latching component is slidably arranged at the other end of the cover, a latching groove matched with the latching component is defined in the grip portion, and a second reset component elastically abutting against the latching component is arranged in the cover, to keep the latching component in the latching groove.

23. The follow focus controller according to claim 22, wherein the cover comprises a first cover body and a second cover body;
wherein the first cover body is fixed to a side of the second cover body facing the battery compartment, and a sliding groove is defined between the first cover body and the second cover body;
the latching component comprises a sliding portion, an operating portion, and a fastening portion;
wherein the first cover body is defined with a first through-opening communicating with the sliding groove, the second cover body is defined with a second through-opening communicating with the sliding groove, the sliding portion is slidably arranged in the sliding groove, the second reset component is arranged in the sliding groove and elastically abuts against the sliding portion, to apply an elastic force to the sliding portion toward the latching groove, the fastening portion is located in the first through-opening, and the operating portion is located in the second through-opening.

24. The follow focus controller according to claim 21, wherein the setting portion is further provided with a second interface electrically connected to the second control circuit board, and the second control circuit board is further configured to communicate with an external device plugged into the second interface to select a working mode after obtaining a corresponding protocol.

25. The follow focus controller according to claim 24, wherein the working mode comprises:
a charging mode, with the external device charging the second battery at a corresponding voltage and current; and
a power supply mode, with the second battery supplying power to the external device at a corresponding voltage and current.

26. The follow focus controller according to claim 21, further comprising:
a power indication unit, electrically connected to the second control circuit board;
wherein the power indication unit comprises a button and a plurality of indicator lights, the button is configured to wake up the indicator lights, and the indicator lights are configured to indicate a current level of the second battery.

27. The follow focus controller according to claim 1, wherein the body comprises:
a first body, provided with an indication sign;
the follow focus controller further comprises:
a position ring, connected to the first follow focus adjusting assembly to rotate with the first follow focus adjusting assembly, and configured for the indication sign to indicate a rotation position of the first follow focus adjusting assembly; and
an illumination structure, configured to illuminate the rotation position of the first follow focus adjusting assembly indicated by the indication sign.

28. The follow focus controller according to claim 27, wherein the position ring is provided with a position marker for the indication sign to be aligned with; and
the illuminating structure comprises an illumination component arranged on the first body for illuminating the position marker aligned with the indication sign.

29. The follow focus controller according to claim 28, wherein,
the illumination component is located on a side of the first body facing the position ring, the position ring is provided with a light-transmitting area, the light-transmitting area covers the illumination component, and the position marker is located in the light-transmitting area.

30. The follow focus controller according to claim 29, wherein the illumination component comprises a display light, and the display light is located on an indication path of the indication sign.

31. The follow focus controller according to claim 27, wherein the illumination structure comprises a light-emitting strip, and the light-emitting strip is arranged on the position ring along a circumferential direction of the position ring, or is integrally formed on the position ring;
the light-emitting strip is divided into a plurality of display areas along a length direction of the light-emitting strip, the plurality of display areas have different display colors or different display brightness levels, and the indication sign is aligned with one of the display areas of the light-emitting strip to indicate the rotation position of the follow focus adjusting assembly.

32. The follow focus controller according to claim 31, wherein the illumination structure further comprises a light control circuit board and a wireless assembly and/or a light control button electrically connected to the light control circuit board, and the light control circuit board is electrically connected with the light-emitting strip;
the light control circuit board is configured to send a light control signal to the light-emitting strip to adjust color displaying or brightness level displaying of the light-emitting strip.

33. The follow focus controller according to claim 27, wherein the control assembly comprises a first control circuit board;
the illumination structure is electrically connected to the first control circuit board, the first control circuit board sends an illumination control signal to the illumination structure, to allow the illumination structure to adjust a display mode according to the illumination control signal.

34. The follow focus controller according to claim 27, wherein the first follow focus adjusting assembly comprises:
an adjustment knob, rotatably arranged on the first body and configured to rotate for follow focus adjustment;
the position ring is detachably sleeved on the adjustment knob.

35. The follow focus controller according to claim 34, wherein,
an outer peripheral wall of the adjustment knob is protruded to provide a plurality of latching portions, and the plurality of latching portions are arranged at intervals along a circumferential direction of the adjustment knob; and
the position ring is defined with a plurality of latching slots;
wherein each of the latching portions is correspondingly inserted into one of the latching slots.

36. The follow focus controller according to claim 35, wherein,
the latching portions are provided with first magnetic components, the latching slots are provided with second magnetic components, and the first magnetic components are magnetically attracted to the second magnetic components; and/or,
an outer peripheral wall of the adjustment knob is provided with a positioning protrusion, the position ring is defined with a positioning notch, and the positioning protrusion is inserted into the positioning notch.

37. The follow focus controller according to claim 1, wherein,
the body comprises a first body;
the control assembly comprises a first control circuit board;
the follow focus controller further comprises:
a first battery; and
a third battery;
wherein the first battery and the third battery are arranged on the first body and electrically connected to the first control circuit board to power the first control circuit board.

38. The follow focus controller according to claim 37, wherein,
a side of the first body is protruded outward to form a mounting portion, and the first follow focus adjusting assembly is mounted on the mounting portion;
the mounting portion is defined with a mounting cavity matched to the third battery, and the third battery is mounted in the mounting cavity.

39. The follow focus controller according to claim 38, wherein the first body comprises:
a first housing, defined with an accommodation cavity and an opening communicating with the accommodation cavity, the opening being located on a side of the first housing, and the first control circuit board and the first battery being located in the accommodation cavity; and
a second housing, detachably connected to the first housing and covering the opening, the mounting portion being provided on the second housing, and the mounting cavity being communicated with the accommodation cavity.

40. The follow focus controller according to claim 37, wherein at least one of the first battery and the third battery is a fast charging capacitor.

41. A follow focus system, comprising:
follow focus motors; and
the follow focus controller of claim 1, the follow focus controller being communicated with the follow focus motors to control the follow focus motors to work.

* * * * *